(12) United States Patent
Zhang et al.

(10) Patent No.: US 12,555,009 B2
(45) Date of Patent: Feb. 17, 2026

(54) UPDATING OF A STATISTICAL SET FOR DECENTRALIZED DISTRIBUTED TRAINING OF A MACHINE LEARNING MODEL

(71) Applicant: International Business Machines Corporation, Armonk, NY (US)

(72) Inventors: Wei Zhang, Elmsford, NY (US); Xiaodong Cui, Chappaqua, NY (US); Xin Wang, Chappaqua, NY (US); Zhaonan Sun, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1084 days.

(21) Appl. No.: 17/314,450

(22) Filed: May 7, 2021

(65) Prior Publication Data
US 2022/0374747 A1    Nov. 24, 2022

(51) Int. Cl.
*G06N 7/01*    (2023.01)

(52) U.S. Cl.
CPC ..................... *G06N 7/01* (2023.01)

(58) Field of Classification Search
CPC ........... G06N 7/01; G06N 3/098; G06N 20/00
See application file for complete search history.

(56) References Cited

U.S. PATENT DOCUMENTS

| 5,592,589 | A | 1/1997 | Poon |
| 2019/0286373 | A1 | 9/2019 | Karumbunathan et al. |
| 2019/0385092 | A1* | 12/2019 | Benke ............... H04L 9/14 |
| 2023/0106985 | A1* | 4/2023 | Hu .................. G06N 3/045 |
| | | | 706/25 |

(Continued)

OTHER PUBLICATIONS

Mell et al., "The NIST Definition of Cloud Computing," Recommendations of the National Institute of Standards and Technology, NIST Special Publication 800-145, Sep. 2011, 7 pages.

(Continued)

*Primary Examiner* — Markus A. Vasquez
(74) *Attorney, Agent, or Firm* — Amin, Turocy & Watson, LLP

(57) ABSTRACT

Systems, computer-implemented methods, and/or computer program products to facilitate updating, such as averaging and/or training, of one or more statistical sets are provided. According to an embodiment, a system can comprise a memory that stores computer executable components and a processor that executes the computer executable components stored in the memory. The computer executable components can include a computing component that updates a first statistical set with an additional statistical set from an additional system. The additional statistical set can have been generated from a parent statistical set that is based on underlying data. To update the first statistical set, the additional statistical set can be obtained by the system without obtaining the parent statistical set and without obtaining the underlying data. According to an embodiment, the first statistical set can be a model parameter set generated from a first parent statistical set that is an analytical model.

20 Claims, 10 Drawing Sheets
(1 of 10 Drawing Sheet(s) Filed in Color)

(56) References Cited

U.S. PATENT DOCUMENTS

| | | | | |
|---|---|---|---|---|
| 2023/0188319 A1* | 6/2023 | Froelicher | ............... | G06N 3/098 |
| | | | | 713/189 |
| 2023/0223028 A1* | 7/2023 | Thakkar | ............... | G06F 21/6245 |
| | | | | 704/270 |
| 2023/0297844 A1* | 9/2023 | Satheesh Kumar | ... | G06N 3/098 |
| | | | | 706/20 |

OTHER PUBLICATIONS

Poor, "Competition and Collaboration in Wireless Sensor Networks," in Sensor Networks, Springer Series on Signals and Communication Technology, G. Ferrari (Ed.) 2010, 13 pages.

Predd et al., "A collaborative training algorithm for distributed learning." IEEE Transactions on Information Theory 55.4 (2009): 1856-1871.

Ram et al., "Distributed and recursive parameter estimation in parametrized linear state-space models." IEEE Transactions on Automatic Control 55.2 (2010): 488-492.

Chen, et al. "Parallel recursive prediction error algorithm for training layered neural networks." International Journal of control 51.6 (1990): 1215-1228.

Laskowski, "An agent based decision support framework for healthcare policy, augmented with stateful genetic programming." Dissertation—University of Manitoba (2011), 24 pages.

Beaulieu-Jones et al. "Privacy-preserving distributed deep learning for clinical data." arXiv: 1812.01484v1 [cs.LG] Dec. 4, 2018, 6 pages.

McMahan et al., "Communication-Efficient Learning of Deep Networks from Decentralized Data," arXiv:1602.05629v3 [cs.LG] Feb. 28, 2017, 11 pages.

Zhang et al., "Improving Efficiency in Large-Scale Decentralized Distributed Training," ICASSP 2020-2020 IEEE International Conference on Acoustics, Speech and Signal Processing (ICASSP), 5 pages.

* cited by examiner

UPDATING OF A STATISTICAL SET FOR DECENTRALIZED DISTRIBUTED TRAINING OF A MACHINE LEARNING MODEL

BACKGROUND

One or more embodiments herein relate generally to improvement of decentralized distributed training of a machine learning model, and more specifically, to asynchronous updating, such as averaging and/or training, of a statistical set being non-centrally located relative to one or more other statistical sets to thereby train the machine learning model.

SUMMARY

The following presents a summary to provide a basic understanding of one or more embodiments described herein. This summary is not intended to identify key or critical elements, or to delineate any scope of the particular embodiments or any scope of the claims. The sole purpose of the summary is to present concepts in a simplified form as a prelude to the more detailed description that is presented later. In one or more embodiments described herein, devices, systems, computer-implemented methods, apparatus and/or computer program products are described that can facilitate the updating, such as averaging and/or training, of one or more statistical sets.

According to an embodiment, a system can comprise a memory that stores computer executable components and a processor that executes the computer executable components stored in the memory. The computer executable components can include a computing component that updates a first statistical set with an additional statistical set from an additional system. The additional statistical set has been generated from a parent statistical set that is based on underlying data. To update the first statistical set, the additional statistical set is obtained by the system without obtaining the parent statistical set and without obtaining the underlying data.

According to another embodiment, a computer-implemented method can comprise updating, by a system operatively coupled to a processor, a first statistical set with an additional statistical set from an additional system. The additional statistical set has been generated from a parent statistical set that is based on underlying data. To update the first statistical set, the additional statistical set is obtained by the system without obtaining the parent statistical set and without obtaining the underlying data.

According to yet another embodiment, a computer program product, facilitating a process to update a statistical set, can comprise a computer readable storage medium having program instructions embodied therewith. The program instructions can be executable, by a processor of a system, to cause the processor to update, by the processor, a first statistical set with an additional statistical set from an additional system. The additional statistical set has been generated from a parent statistical set that is based on underlying data. To update the first statistical set, the additional statistical set is obtained by the system without obtaining the parent statistical set and without obtaining the underlying data.

DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
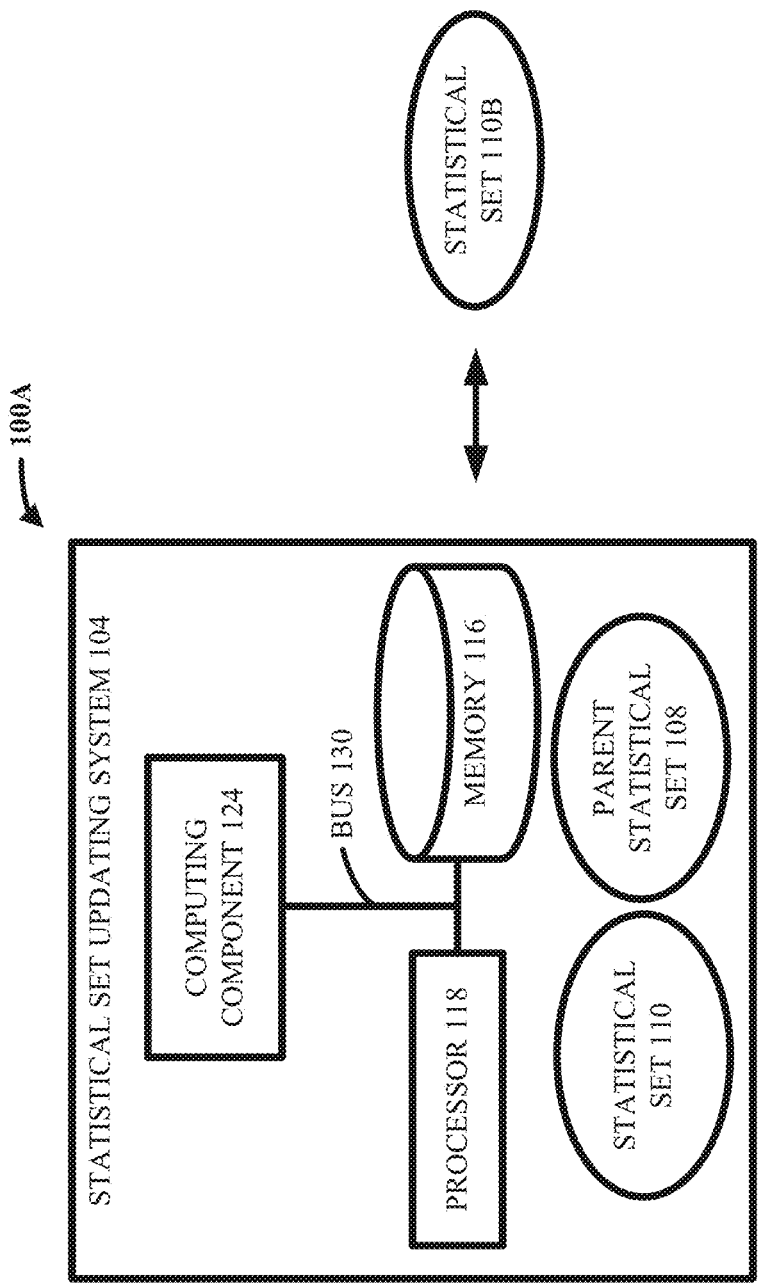
FIG. 1A illustrates a block diagram of an example, non-limiting system that can facilitate updating, such as averaging and/or training, of a statistical set, in accordance with one or more embodiments described herein.

The following detailed description is merely illustrative and is not intended to limit embodiments, application and/or uses of embodiments. Furthermore, there is no intention to be bound by any expressed and/or implied information presented in the preceding Background and/or Summary sections, and/or in this Detailed Description section.

Use of large statistical sets continues to become increasingly commonplace both domestically and commercially in various industries. For example, large-scale distributed training can play a role in deep learning to allow for dealing with large amounts of training data and models or other statistics with deep architectures. In one or more examples, statistical sets, such as including machine learning (ML) models, can be constructed related to patient medical history, patient family genetic history, financial backgrounds, purchase history, item availability and/or the like. Such ML models can be utilized for a variety of determinations such as medical diagnoses, healthcare record comparison, population health analysis, insurance liability, chance of financial default, speech recognition, text recognition, image recognition, computer vision and/or the like.

As used herein, a statistical set can include, in addition to an ML model, one or more statistics, such as aspects of data, optimized and/or transformed data, model parameters, gradients and/or the like, and/or can include at least a portion of an analytical model, such as an ML model. The statistics can be realized from and/or based upon data including, but not limited to, raw data, transformed data, textual data, structured data, unstructured data, image and/or audio data, programming data, training data, data provided in a numerical language, and/or data concerning one or more qualities for an optimization technique and/or the like.

In one or more cases, multiple versions and/or portions of a statistical set can exist across various machines, which machines can be provided at a plurality of nodes that can be locally and/or non-centrally distributed relative to one another. One or more of the versions and/or portions of a statistical set can be different from one another. In one or more cases, versions and/or portions of a statistical set can be updated, such as averaged and/or trained, differently than one another. Nonetheless, the different versions and/or portions of the statistical set can together define a globally-accessible set of data underlying the versions and/or portions of the statistical set. That is, each of, a majority of, or many of the versions and/or portions of a statistical set can be accessible to each of, a majority of, or many of the others of the plurality of nodes.

For example, in one embodiment, nodes of a multi-node system can communicate with at least a portion, if not all, of the other nodes in the multi-node system to thereby share versions and/or portions of a statistical set, such as raw data, an ML model and/or the like. Convergence rate to consensus of the statistical set(s) being updated can be limited by the speed and/or processing power of any one node. Nonetheless, the globally-accessibility of the versions and/or portions of the statistical set enables the nodes to ultimately compute respective same or majoratively similar updated statistical sets after one or more iterations of updating, such as averaging and/or training, are completed at the nodes.

As a tradeoff to the global accessibility of the versions and/or portions of a statistical set, it will be appreciated that securing the versions and/or portions of the statistical set can be made more difficult. That is, a third party with negative intentions, such as a digital or network intruder, can, in one or more cases, obtain all of or a majority of the versions and/or portions of the statistical set by intruding into any one of the aforementioned plurality of nodes. For example, a third party can utilize one node's accessibility to others of the plurality of nodes. In another example, a third party can obtain an updated statistical set from one of the plurality of nodes, such as where the updated statistical set is an averaging of models and/or raw data. That is, the third party can thus have access to models and/or raw data from each of the nodes by accessing only one of the nodes.

Given these problems, one or more embodiments described herein can be implemented to produce a solution to one or more of these problems in the form of systems, computer-implemented methods, and/or computer program products that can facilitate updating, such as averaging and/or training of a statistical set. The systems, computer-implemented methods, and/or computer program products also can facilitate implementing one or more processes to secure the data underlying the statistical set from being obtained by a third party.

Generally, one or more embodiments described herein facilitate computation of separate parent statistical sets, such as analytical models. Further, the separate parent statistical sets are not shared amongst the plurality of nodes. Rather, only statistical sets generated from parent statistical sets are shared amongst the plurality of nodes. In this way, a third party looking to wrongfully obtain the various underlying data(s) cannot intrude into one node to obtain underlying data or a parent statistical set from each of the nodes of the plurality of nodes. Rather, such ill-intentioned third party only can intrude into each node of the plurality of nodes to obtain such underlying data and parent statistical sets, thereby providing a level of security and/or legal/regulatory/contractual compliance regarding the underlying data.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident in various cases, however, that the one or more embodiments can be practiced without these specific details.

Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems 100A, 100B, 200 and/or 300 illustrated at FIGS. 1A, 1B, 2 and/or 3, and/or systems thereof, can further comprise one or more computer and/or computing-based elements described herein with reference to an operating environment, such as the operating environment 800 illustrated at FIG. 8. In one or more described embodiments, computer and/or computing-based elements can be used in connection with implementing one or more of the systems, devices, components and/or computer-implemented operations shown and/or described in connection with FIGS. 1A, 1B, 2 and/or 3 and/or with other figures described herein.

Turning now in particular to one or more figures, and first to FIG. 1A, the figure illustrates a block diagram of an example, non-limiting system 100A that can facilitate updating, such as averaging and/or training, of one or more statistical sets in accordance with one or more embodiments described herein.

The non-limiting system 100A can comprise a statistical set updating system 104, which can be associated with a cloud computing environment. The non-limiting system 100A can comprise one or more components, such as a memory 116, processor 118 and/or computing component 124. Generally, statistical set updating system 104, and thus non-limiting system 100A, can facilitate updating, such as training and/or averaging of a statistical set 110. That is, the computing component 124 can update a first statistical set (e.g., statistical set 110) with an additional statistical set (e.g., additional statistical set 110B) from an additional system (not shown). The first statistical set (e.g., statistical set 110) can be compatible with, such as comprising a same data type and/or data regarding a same subject matter as, the additional statistical set (e.g., additional statistical set 110B) from the additional system. In one or more embodiments, the non-limiting system 100A and the additional system can be decentralized relative to one another.

The first statistical set (e.g., statistical set 110) has been generated from a parent statistical set 108, such as an analytical model. The parent statistical set 108 can be based on underlying data. In one or more embodiments, the first statistical set (e.g., statistical set 110) can comprise a different type of data than the parent statistical set 108. In one or more embodiments, the underlying data cannot be compiled (e.g., be non-compilable) from the first statistical set (e.g., statistical set 110). That is, the first statistical set (e.g., statistical set 110) can comprise a type of data that does not allow for compilation of underlying data of the respective parent statistical set therefrom.

Likewise, the additional statistical set 110B also has been generated from a respective additional parent statistical set (not shown). Also likewise, the additional parent statistical set can be based on underlying data. In one or more embodiments, the additional statistical set (e.g., additional statistical set 110B) can comprise a different type of data than the respective parent statistical set from which it has been generated. In one or more embodiments, the underlying data upon which the respective parent statistical set is based cannot be compiled (e.g., be non-compilable) from the additional statistical set (e.g., additional statistical set 110B). That is, the additional statistical set (e.g., additional statistical set 110B) can comprise a type of data that does not allow for compilation of the respective underlying data therefrom.

One or more of the underlying datas can be of a type that can include one or more private aspects of data, such as patient health information, financial information, proprietary research information, proprietary business information and/or the like. One or more of the underlying datas can be of a type related to molecular, cellular, geonic, clinical, behavioral and/or environmental data and/or the like. It will be appreciated that the private aspects of data can be those than can be non-shareable, such as due to one or more contracts, regulations, laws (e.g., HIPAA) and/or customs.

Accordingly, the one or more processes to be performed by the statistical set updating system 104 can provide updating of a first statistical set (e.g., statistical set 110) and of a related parent statistical set (e.g., parent statistical set 108) without sharing of underlying data. That is, the parent statistical set 108 and the respective underlying data are not shared with the additional system (e.g., providing and/or comprising the additional statistical set). Rather, only statistical sets generated from parent statistical sets (e.g., the statistical set 110 and the additional statistical set 110B) are shared. In this way, a third party looking to wrongfully obtain the various underlying data(s) cannot intrude into one system to obtain underlying data or a parent statistical set from another system. Rather, such ill-intentioned third party only can intrude into each of the non-limiting system 100A and the additional system to obtain all such underlying data and parent statistical sets, thereby providing a level of security and/or legal/regulatory/contractual compliance regarding the underlying data.

Figure 1B:
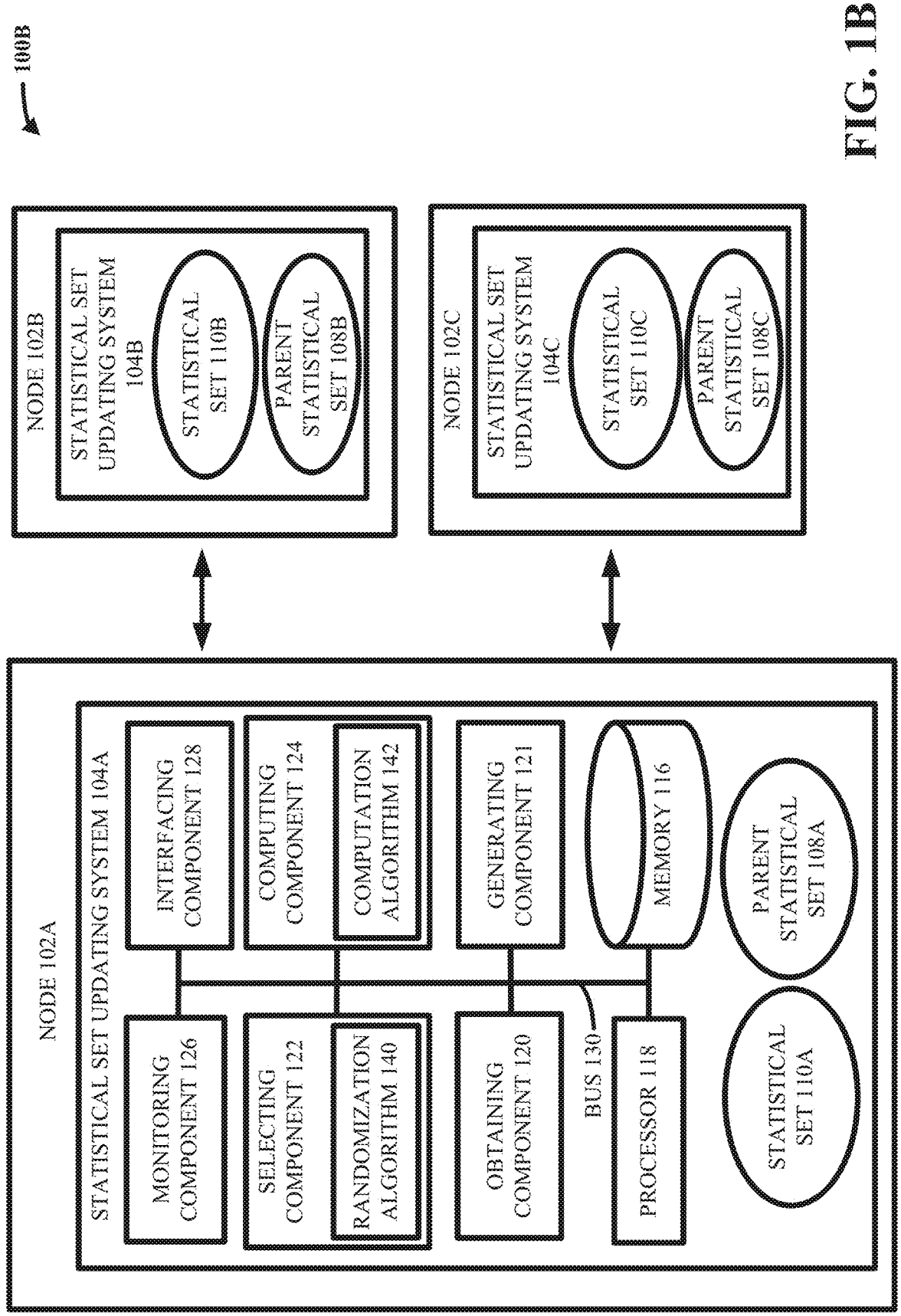
FIG. 1B illustrates another block diagram of an example, non-limiting system that can facilitate updating, such as averaging and/or training, of a statistical set, in accordance with one or more embodiments described herein.

Turning now to FIG. 1B, the figure illustrates a block diagram of an example, expanded non-limiting system 100B that can facilitate updating, such as averaging and/or training, of one or more statistical sets in accordance with one or more embodiments described herein. The expanded non-limiting system 100B illustrated at FIG. 1B includes all of the elements, components, aspects, functions and/or abilities of the non-limiting system 100A illustrated at FIG. 1A, in addition to also illustrating and/or including additional elements, components, aspects, functions and/or abilities. Repetitive description of same and/or like elements and/or processes employed is omitted for sake of brevity. For example, previous discussion with respect to the non-limiting system 100A of FIG. 1A being capable of employing one or more computing resources of the cloud computing environment 950 and/or one or more of the functional abstraction layers 1060, 1070, 1080 and/or 1090 also applies equally to the expanded non-limiting system 100B of FIG. 1B.

It will be appreciated that the following description(s) refer(s) to the updating of a single statistical set generated from a single parent statistical set. However, it also will be appreciated that one or more of the processes described herein can be scalable. For example, as will be appreciated below, the statistical set updating system 104A can update two or more statistical sets in parallel. Additionally and/or alternatively, one or more nodes of the non-limiting system 100 can update respective statistical sets at respective statistical set updating systems thereof (e.g., statistical set updating systems 104B and 104C), to be described below in detail. These various levels of scaling can enable fast and efficient updating, such as averaging and/or training, of separate respective statistical sets and thus separate updating, such as averaging and/or training, of separate respective parent statistical sets without sharing the respective parent statistical sets among the various nodes of the non-limiting system.

The expanded non-limiting system 100B can comprise a statistical set updating system 104A, which can be associated with a cloud computing environment. The statistical set updating system 104A can be comprised by a node 102A, which node 102A can include one or more machines comprised by the statistical set updating system 104A. As used herein, the one or more machines can include one or more of a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone and/or another type of device.

In one or more examples, the expanded non-limiting system 100B can comprise a plurality of such nodes, e.g., nodes 102A, 102B, 102C, etc., and thus a plurality of statistical set updating systems 104A, 104B, 104C, etc. In another example, the statistical set updating system 104A can be associated with a cloud computing environment 950 described below with reference to FIG. 9 and/or with one or more functional abstraction layers described below with reference to FIG. 10 (e.g., hardware and software layer 1060, virtualization layer 1070, management layer 1080 and/or workloads layer 1090). In the previous example, the nodes 102A, 102B and 102C can communicate with one another via a cloud computing environment, such as the cloud computing environment 950.

Statistical set updating system 104A and/or components thereof (e.g., obtaining component 120, generating component 121, selecting component 122, computing component 124, monitoring component 126 and/or interfacing component 128) can employ one or more computing resources of the cloud computing environment 950 described below with reference to FIG. 9, and/or with reference to the one or more functional abstraction layers (e.g., quantum software and/or the like) described below with reference to FIG. 10, can execute one or more operations in accordance with one or more embodiments described herein. For example, cloud computing environment 950 and/or one or more of the functional abstraction layers 1060, 1070, 1080 and/or 1090 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by statistical set updating system 104A and/or components thereof to execute one or more operations in accordance with one or more embodiments described herein. For instance, statistical set updating system 104A and/or components thereof can employ one or more classical and/or quantum computing resources to execute one or more classical and/or quantum: mathematical functions, calculations and/or equations; computing and/or processing scripts; algorithms; models (e.g., artificial intelligence (AI) models, machine learning (ML) models and/or other analytical model); and/or another operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein can be capable of being implemented in conjunction with any other type of computing environment now known or later developed.

Cloud computing can be a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model can include at least five characteristics, at least three service models, and at least four deployment models.

Characteristics can be as follows:

On-demand self-service: a cloud consumer can unilaterally provision computing capabilities, such as server time and network storage, as needed automatically without requiring human interaction with the service's provider.

Broad network access: capabilities can be available over a network and accessed through standard mechanisms that can promote use by heterogeneous thin or thick client platforms (e.g., mobile phones, laptops, and PDAs).

Resource pooling: the provider's computing resources can be pooled to serve multiple consumers using a multi-tenant model, with different physical and virtual resources dynamically assigned and reassigned according to demand There can be a sense of location independence in that the consumer generally can be without control and/or knowledge over the exact location of the provided resources but can be able to specify location at a higher level of abstraction (e.g., country, state and/or datacenter).

Rapid elasticity: capabilities can be rapidly and elastically provisioned, in one or more cases automatically, to quickly scale out and rapidly released to quickly scale in. To the consumer, the capabilities available for provisioning often can appear to be unlimited and can be purchased in any quantity at any time.

Measured service: cloud systems can automatically control and/or optimize resource use by leveraging a metering capability at one or more levels of abstraction appropriate to the type of service (e.g., storage, processing, bandwidth and/or active user accounts). Resource usage can be monitored, controlled and/or reported, providing transparency for both the provider and consumer of the utilized service.

Service Models can be as follows:

Software as a Service (SaaS): the capability provided to the consumer can be to use the provider's applications running on a cloud infrastructure. The applications can be accessible from various client devices through a thin client interface such as a web browser (e.g., web-based e-mail). The consumer does not manage or control the underlying cloud infrastructure including network, servers, operating systems, storage and/or individual application capabilities, with the possible exception of limited user-specific application configuration settings.

Platform as a Service (PaaS): the capability provided to the consumer can be to deploy onto the cloud infrastructure consumer-created or acquired applications created using programming languages and tools supported by the provider. The consumer does not manage or control the underlying cloud infrastructure including networks, servers, operating systems and/or storage, but can have control over the deployed applications and possibly application hosting environment configurations.

Infrastructure as a Service (IaaS): the capability provided to the consumer can be to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models can be as follows:

Private cloud: the cloud infrastructure can be operated solely for an organization. The cloud infrastructure can be managed by the organization and/or a third party and can exist on-premises or off-premises.

Community cloud: the cloud infrastructure can be shared by one or more organizations and can support a specific community that can have shared concerns (e.g., mission, security requirements, policy and/or compliance considerations). The cloud infrastructure can be managed by the organizations or a third party and can exist on-premises or off-premises.

Public cloud: the cloud infrastructure can be made available to the general public or to a large industry group and can be owned by an organization selling cloud services.

Hybrid cloud: the cloud infrastructure can be a composition of two or more clouds (private, community or public) that can remain unique entities but can be bound together by standardized or proprietary technology that can enable data and/or application portability (e.g., cloud bursting for load-balancing among clouds).

A cloud computing environment can be service-oriented with a focus on statelessness, low coupling, modularity and/or semantic interoperability. At the heart of cloud computing can be an infrastructure that can include a network of interconnected nodes.

Moreover, the expanded non-limiting system 100B can be associated with or can be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, the expanded non-limiting system 100B can be employed to use hardware and/or software to solve problems that are highly technical in nature, that are not abstract and/or that cannot be performed as a set of mental acts by a human.

Turning now to aspects of the statistical set updating system 104A, various functions can be performed by one or more components thereof, such as a memory 116, processor 118, obtaining component 120, generating component 121, selecting component 122, computing component 124, monitoring component 126 and/or interfacing component 128.

Memory 116 can store one or more computer and/or machine readable, writable and/or executable components and/or instructions that, when executed by processor 118 (e.g., a classical processor, a quantum processor and/or like processor), can facilitate performance of operations defined by the executable component(s) and/or instruction(s). For example, memory 116 can store computer and/or machine readable, writable and/or executable components and/or instructions that, when executed by processor 118, can facilitate execution of the various functions described herein relating to statistical set updating system 104A, obtaining component 120, generating component 121, selecting component 122, computing component 124, monitoring component 126, interfacing component 128 and/or another component associated with statistical set updating system 104A as described herein with or without reference to the various figures of the one or more embodiments.

Memory 116 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures. Further examples of memory 116 are described below with reference to system memory 806 and FIG. 8. These examples of memory 116 can be employed to implement any one or more embodiments described herein.

Processor 118 can comprise one or more types of processors and/or electronic circuitry (e.g., a classical processor, a quantum processor and/or like processor) that can implement one or more computer and/or machine readable, writable and/or executable components and/or instructions that can be stored at memory 116. For example, processor 118 can perform various operations that can be specified by computer and/or machine readable, writable and/or executable components and/or instructions including, but not limited to, logic, control, input/output (I/O), arithmetic and/or the like. In one or more embodiments, processor 118 can comprise one or more of a central processing unit, multi-core processor, microprocessor, dual microprocessors, microcontroller, System on a Chip (SOC), array processor, vector processor, quantum processor and/or another type of processor. Additional examples of processor 118 are described below with reference to processing unit 804 and FIG. 8. The examples of processor 118 can be employed to implement any one or more embodiments described herein.

Statistical set updating system 104A, memory 116, processor 118, obtaining component 120, generating component 121, selecting component 122, computing component 124, monitoring component 126, interfacing component 128 and/or another component of statistical set updating system 104A as described herein can be communicatively, electrically, operatively and/or optically coupled to one another via a bus 130 to perform functions of expanded non-limiting system 100B, statistical set updating system 104A and/or any components coupled therewith. Bus 130 can comprise one or more of a memory bus, memory controller, peripheral bus, external bus, local bus, quantum bus and/or another type of bus that can employ various bus architectures. Further examples of bus 130 are described below with reference to system bus 808 and FIG. 8. The examples of bus 130 can be employed to implement any one or more embodiments described herein.

Statistical set updating system 104A can comprise any type of component, machine, device, facility, apparatus and/or instrument that can comprise a processor and/or can be capable of effective and/or operative communication with a wired and/or wireless network. All such embodiments are envisioned. For example, statistical set updating system 104A can comprise a server device, computing device, general-purpose computer, special-purpose computer, quantum computing device (e.g., quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device.

Statistical set updating system 104A can be coupled (e.g., communicatively, electrically, operatively, optically and/or the like) to one or more external systems, sources and/or devices (e.g., classical and/or quantum computing devices, communication devices and/or the like) via a data cable (e.g., High-Definition Multimedia Interface (HDMI), recommended standard (RS) 232, Ethernet cable and/or the like). In one or more embodiments, statistical set updating system 104A can be coupled (e.g., communicatively, electrically, operatively, optically and/or the like) to one or more external systems, sources and/or devices (e.g., classical and/or quantum computing devices, communication devices and/or the like) via a network, such as statistical set updating systems 104B and 104C, being decentralized relative to one another and relative to statistical set updating system 104A.

In one or more embodiments, a network can comprise one or more wired and/or wireless networks, including, but not limited to, a cellular network, wide area network (WAN) (e.g., the Internet), or local area network (LAN). For example, statistical set updating system 104A can communicate (and vice versa) with one or more external systems, sources and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, statistical set updating system 104A can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and software that can facilitate communicating information among statistical set updating system 104A and external systems, sources and/or devices (e.g., computing devices, communication devices and/or the like).

Statistical set updating system 104A can comprise one or more computer and/or machine readable, writable and/or executable components and/or instructions that, when executed by processor 118 (e.g., a classical processor, a quantum processor and/or the like), can facilitate performance of one or more operations defined by such component(s) and/or instruction(s). Further, in one or more embodiments, one or more components associated with statistical set updating system 104A, as described herein with or without reference to the various figures, can comprise one or more computer and/or machine readable, writable and/or executable components and/or instructions that, when executed by processor 118, can facilitate performance of one or more operations defined by such component(s) and/or instruction(s). For example, obtaining component 120, generating component 121, selecting component 122, computing component 124, monitoring component 126, interfacing component 128 and/or any other components associated with statistical set updating system 104A as disclosed herein (e.g., communicatively, electronically, operatively and/or optically coupled with and/or employed by statistical set updating system 104A), can comprise such computer and/or machine readable, writable and/or executable component(s) and/or instruction(s). Consequently, according to one or more embodiments, statistical set updating system 104A and/or one or more components associated therewith as disclosed herein, can employ processor 118 to execute such computer and/or machine readable, writable and/or executable component(s) and/or instruction(s) to facilitate performance of one or more operations described herein with reference to statistical set updating system 104A and/or any such components associated therewith.

Statistical set updating system 104A can facilitate (e.g., via processor 118) performance of operations executed by and/or associated with obtaining component 120, generating component 121, selecting component 122, computing component 124, monitoring component 126, interfacing component 128 and/or another component associated with statistical set updating system 104A as disclosed herein. For instance, as described in detail below, statistical set updating system 104A can facilitate via processor 118 (e.g., a classical processor, a quantum processor and/or the like) a variety of processes including, but not limited to: a) updating, including averaging and/or training, of a statistical set; b) computing one or more additional iterations of updating; c) communicating among nodes of a system according to a randomization pattern; d) selecting communicating subsets of the nodes according to the randomization pattern; and/or e) interfacing with an entity to provide a status regarding the computations and/or regarding convergence rate to consensus of the statistical set being updated. As will be apparent from the below, one or more statistical sets acted upon by the statistical set updating system 104A can be generated from respective parent statistical sets and can include, while not being limited to, an ML model, gradient, optimized and/or transformed data, model parameters and/or similar. As used herein, the terms "entity" and "user entity" can refer to a machine, device, component, hardware, software, smart device and/or human.

Turning now to additional aspects illustrated at FIG. 1, such as the components of the statistical set updating system 104A as illustrated in FIG. 1, further functionality of the statistical set updating system 104A will be described. Additional description of functionalities will be further described below with reference to the example embodiments of FIGS. 2 and 3, where repetitive description of like elements and/or processes employed in respective embodiments is omitted for sake of brevity.

Looking first to the nodes 102A, 102B and 102C collectively, and to data shared and/or not-shared between these nodes, one or more of these nodes can have respective raw data. At one or more of the nodes 102A, 102B and 102C, a parent statistical set can generally be generated (e.g., respective parent statistical sets 108A, 108B and 108C), such as derived and/or otherwise formed, from a respective raw data set. These raw data sets are thus referred to herein as underlying data. Also, at one or more of the nodes, a respective first statistical set (also referred to herein as a statistical set) can generally be at least partly generated, such as derived and/or otherwise formed, from a respective parent statistical set. For example, statistical set 110A can generally be generated from parent statistical set 108A at node 102A; additional statistical set 110B can be generated from additional parent statistical set 108B at node 102B; and additional statistical set 110C can be generated from additional parent statistical set 108C at node 102C.

A respective parent statistical set can have a different data type than a statistical set generated therefrom. The different data types can include, but are not limited to, an analytical model, model parameters and/or model gradients. Referring to each of the statistical sets 110A, 110B and 110C, and in accordance with one or more embodiments described herein, statistical sets can be shared amongst the plurality of nodes of a non-limiting system, while parent statistical sets can remain unshared amongst the plurality of nodes. In one or more embodiments, the statistical sets can not comprise underlying data, and thus underlying data also can be non-shared amongst the plurality of nodes. Additionally, a statistical set can comprise a data type from which the respective underlying data cannot be directly derived, such as model parameters.

For example, the parent statistical sets 108A, 108B and 108C each can be generated from different but compatible raw data, such as healthcare data, financial data and/or other like data. The parent statistical sets 108A, 108B and 108C are not shared amongst the nodes 102A, 102B and 102C. Rather, the statistical sets 110A, 110B and 110C are instead shared amongst the nodes 102A, 102B and 102C. This non-sharing can be facilitated via one or more of programming, software, default settings and/or entity-provided settings. Further, the statistical sets 110A, 110B and 110C are not merely re-generations of underlying data and instead have different data types than the respective parent statistical sets 108A, 108B and 108C from which the statistical sets 110A, 110B and 110C were generated.

To provide an example, a parent statistical set can be an analytical model, such as an ML model. A statistical set can comprise model parameters and can be generated from the parent statistical set/analytical model. In another example, a parent statistical set can be an analytical model, such as an ML model. A statistical set can comprise one or more model gradients and can be derived from the parent statistical set/analytical model. That is, the parent statistical sets, such as ML models, can remain unshared amongst the plurality of nodes. Additionally, the statistical sets (e.g., model parameters or model gradients) can not comprise underlying data, and thus underlying data can remain unshared amongst the plurality of nodes.

As used herein, a model parameter can be a configuration variable for an analytical model, such as an ML model. For example, a model parameter can be a coefficient of a regression function of the data or a weight of a nonlinear transform layer. That is, a value of a model parameter can be estimated from data underlying the analytical model. In one or more cases, model parameters can be learned and/or derived from the underlying data, such as historical training data. That is, model parameters can be related to the underlying data but not directly comprise the underlying data. Oppositely, in one or more cases, underlying data such as historical data cannot be learned and/or derived from the model parameters.

By sharing statistical sets comprising model parameters, an updated statistical set can be computed, and a revised analytical model can be updated, such as trained, based on the updated statistical set. In this way, an analytical model at a node of a plurality of nodes can be trained relative to underlying data from one or more additional nodes without sharing of the actual underlying data from the plurality of nodes with one another.

Rather, the underlying data at/from each node can remain unshared. This non-sharing can be facilitated via one or more of programming, software, default settings and/or entity-provided settings at the respective nodes. Further, each node can have one or more respective security and/or encryption processes and/or systems that can be managed and/or controlled by the node and/or by one or more entities communicating with the node to prevent third party intrusion. Exemplary encryption strategies can include differential privacy and/or homomorphic encryption.

Turning now to one or more operations performed by one or more components of the statistical set updating system 104A, it will be appreciated that such description is equally applicable to the statistical set updating systems 104B and 104C. As will be appreciated, the randomized distributed updating performed by expanded non-limiting system 100B, such as by the statistical set updating system 104A, enables a plurality of statistical set updating systems to perform operations concurrently and/or asynchronously, to be described below in detail. These aspects can result in increasing the decentralized distributed updating efficiency as performed by systems other than those of embodiments described herein. For example, as a tradeoff for maintaining securing of underlying data at each node, a convergence rate to consensus of the various statistical sets 110A, 110B and 110C being updated can be increased relative thereto, with the increase itself resulting in decreased communication cost among the statistical set updating nodes (and/or systems) involved, and/or also more quickly freeing up processing power and/or memory at the statistical set updating nodes (and/or systems) involved.

Further, the following description refers to the updating, such as averaging and/or training, of a plurality of statistical sets, such as the statistical sets 110A, 110B and 110C accessed by a plurality of systems disposed at a plurality of respective decentralized locations, such as the nodes 102A, 102B and 102C. However, it will be appreciated that the statistical set updating system 104A, and/or statistical set updating systems 104B and 104C, can be employed to update one or more additional statistical sets simultaneously, subsequently or in any suitable order. An additional such statistical set can be accessed by an additional plurality of systems disposed at an additional plurality of respective decentralized locations, such as nodes, such that not all of the same nodes 102A, 102B and 102C are included. It also will be appreciated that while the nodes 102A, 102B and 102C are illustrated each as including respective statistical sets 110A, 110B and 110C, as indicated above, any one or more statistical sets can be stored other than at the respective statistical set updating systems 104A, 104B and 104C and respectively provided by the respective statistical set updating systems 104A, 104B and 104C.

For example, the statistical set 110A can be stored at the memory 116 of the statistical set updating system 104A. Alternatively, by way of a non-limiting example, the statistical set 110A can be stored at a memory/storage external to the statistical set updating system 104A or even at a node separate from the node 102A comprising the statistical set updating system 104A, such as a cloud computing node 910 of a cloud computing environment 950 (FIG. 9).

Figure 8:
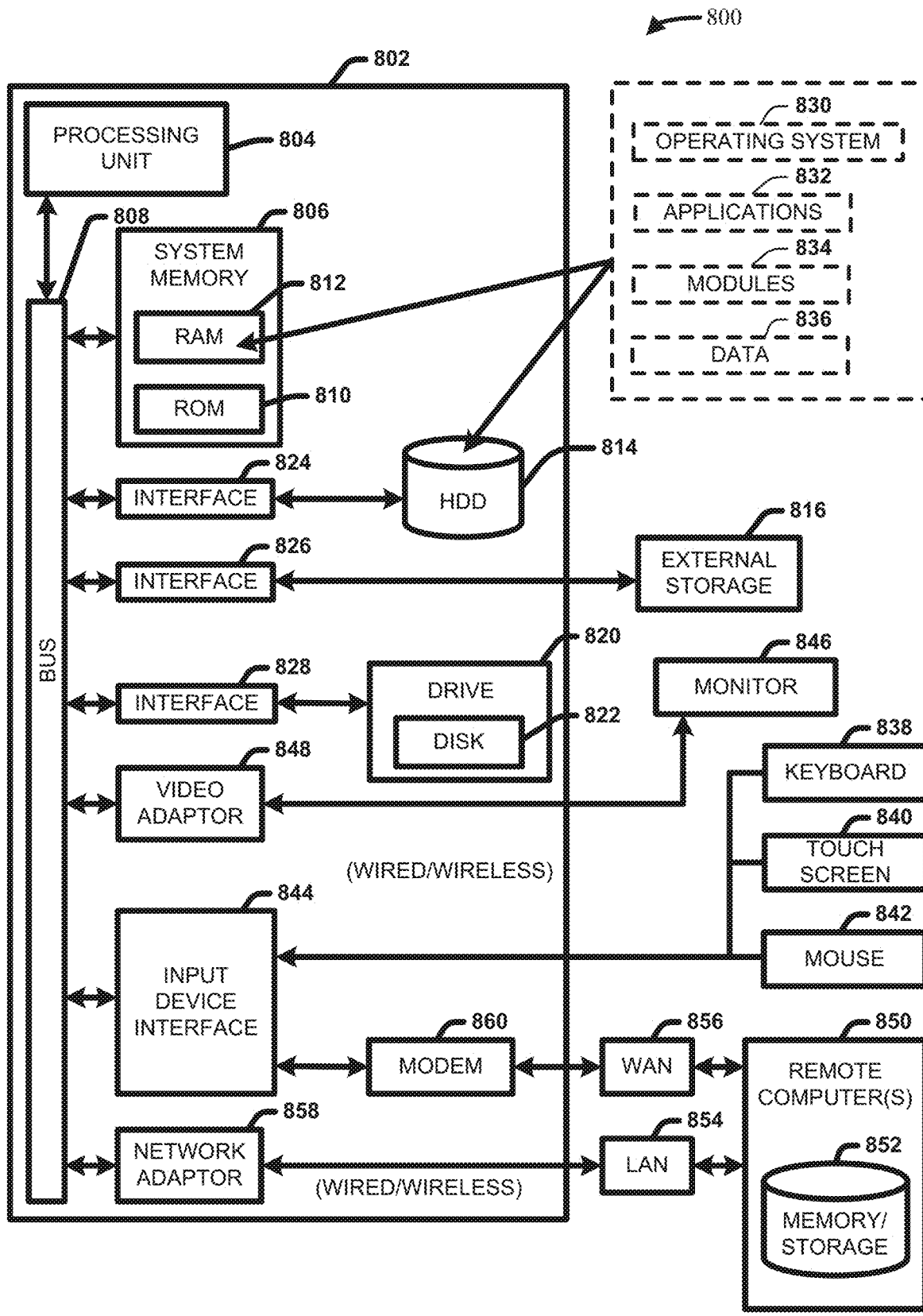
FIG. 8 illustrates a block diagram of an example, non-limiting operating environment in which one or more embodiments described herein can be facilitated.

The obtaining component 120 can employ any one or more aspects of an operating environment, such as the operating environment 800 illustrated at FIG. 8, to provide, such as to receive retrieve and/or otherwise obtain, a parent statistical set to be updated, such as the parent statistical set 108A. By way of a non-limiting example, parent statistical set 1080A can be uploaded from the HDD 814, received from the memory/storage 852 via the WAN 856 and/or downloaded via the WAN 856 from a node, such as a cloud computing node 910 of a cloud computing environment 950 (FIG. 9).

Alternatively, the obtaining component 120 can employ any one or more aspects of an operating environment, such as the operating environment 800 illustrated at FIG. 8, to provide, such as to receive retrieve and/or otherwise obtain, a set of underlying data. The underlying data can be at least partially unique to the node 102A and/or can include one or more private aspects of data, such as patient health information, financial information and/or the like. It will be appreciated that the private aspects of data can be those than can be non-shareable, such as due to contract, regulation, law and/or custom. Accordingly, the one or more processes to be performed by the statistical set updating system 104A can provide updating of a statistical set and of a related parent statistical set without sharing of underlying data.

Where the obtaining component 120 obtains underlying data, the generating component 121 can generate a parent statistical set, such as the parent statistical set 108A, from the underlying data. For example, the parent statistical set can be an analytical model such as an ML model. It will be appreciated that the process of generating and/or training of a model from data can be known to a person having ordinary skill in the art of computational statistics.

Further, the generating component 121 can generate, such as derive and/or otherwise obtain the statistical set 110A from the generated and/or obtained parent statistical set 108A. For example, one or more computations and/or calculations can be performed. In one example, where the parent statistical set 108A is an analytical model and the statistical set 110A can be a set of model parameters at least partially generated from the parent statistical set 108A by the generating component 121. For example, as discussed above, a value of a model parameter can be estimated from data underlying an analytical model. In one or more cases, model parameters can be learned and/or derived from the underlying data, such as historical training data. That is, model parameters can be related to the underlying data but not directly comprise the underlying data.

For example, a parent statistical set can be an analytical model, such as a machine learning model, estimated under one or more criterion, such as cross-entropy criterion. A form of model can be a neural network or a linear or non-linear regression model. For a neural network, the model parameters can include weights of the network. For a regression model, model parameters can include model coefficients.

Additionally and/or alternatively, it will be appreciated that one or more of the aforementioned processes of obtaining and/or generating can be performed external to the expanded non-limiting system 100B and/or to the statistical set updating system 104A. That is, in one or more embodiments, the obtaining component 120 can employ any one or more aspects of an operating environment, such as the operating environment 800 illustrated at FIG. 8, to provide, such as to receive and/or retrieve, a statistical set that does not comprise raw underlying data and/or private aspects of data. In one or more cases, the statistical set, such as the statistical set 110A, can have been generated from a parent statistical set, such as the parent statistical set 108A. By way of a non-limiting example, the statistical set 110A can be uploaded from the HDD 814, received from the memory/storage 852 via the WAN 856 and/or downloaded via the WAN 856 from a node, such as a cloud computing node 910 of a cloud computing environment 950 (FIG. 9).

Once the statistical set 110A is obtained and/or generated, the statistical set updating system 104A can update, such as average and/or train, the statistical set 110A based on underlying data from one or more other nodes, such as the nodes 102B and 102C, but without the node 102A and/or the statistical set updating system 104A having access to the underlying data from the other nodes. To perform such updating, one or more additional statistical sets can be selected from one or more other nodes, such as the nodes 102B and 102C.

For example, the selecting component 122 can select an additional system from which an additional statistical set compatible with the statistical set 110A can be obtained. That is, the statistical set 110A and the additional statistical set (e.g., 110B or 110C) are compatible with one another, such as comprising related statistics, such as regarding the same subject matter(s). For example, compatible statistical sets can each be a portion and/or version of ML models based on similar subject matter(s).

In one or more embodiments, the selecting component 122 can determine a comprehensive set of statistical sets and/or a comprehensive set of systems. One or more of the systems of the comprehensive set of systems can have an additional statistical set being compatible with the statistical set 110A. By way of particular example shown at FIG. 1, the comprehensive set of systems can include a plurality of additional systems (e.g., the statistical set updating systems 104B and 104C) comprising and/or having access to (e.g., able to receive, retrieve, identify and/or like function) one or more additional statistical sets (e.g., 110B or 110C) compatible with the statistical set 110A. In or more embodiments, the statistical set updating system 104A can be included in the comprehensive set of systems. The comprehensive set of statistical sets can include a plurality of additional statistical sets (e.g., 110B and 110C) and the statistical set 110A. The statistical sets 110A, 110B and 110C each can be compatible with one another, such as having a common parent statistical set and/or being versions and/or portions of one another. That is, in one or more embodiments, the statistical set 110A can be included in the comprehensive set of statistical sets.

The comprehensive set of the statistical set updating system 104A and the additional statistical set updating systems 104B and 104C, and/or of the statistical set 110A and the additional statistical sets 110B and 110C, can be stored at the memory 116, stored at an external memory/storage, accessible via an associated cloud computing environment and/or the like. As indicated above, this comprehensive set can be selectively modified by a user entity. Further, it will be appreciated that the updating performed by the statistical set updating system 104A can be performed employing any suitable number of additional statistical sets and/or additional systems.

In one or more embodiments, the selecting component 122 can access a database having locations of the comprehensive set of all compatible statistical sets (e.g., the statistical set 110A and the plurality of additional statistical sets 110B and 110C) and/or of their associated accessing systems (i.e., the statistical set updating system 104A and the plurality of additional statistical set updating systems 104B and 104C). The database can be stored at a memory of the respective statistical set updating system, stored at an external memory/storage, accessible via an associated cloud computing environment and/or the like.

In one or more embodiments, the selecting component 122 can actively search for one or more additional systems from which the additional statistical set can be obtained, such as until the respective searching is exhausted. In one or more embodiments, the selecting component 122 can actively search for one or more additional statistical sets compatible with the statistical set 110A.

Further, it will be appreciated that the comprehensive set of the compatible statistical sets can be selectively modified, such as by a user entity to indicate that one or more of the compatible statistical sets should not be accessed, and/or one or more of the compatible statistical sets can be removed from the comprehensive set (e.g., from the database, table, matrix and/or list), such as temporarily or permanently, for example. One or more respective selective modifications can be made at any suitable time prior to, during and/or after any operation being performed by the statistical set updating system 104A to allow for active modification of the updating performed by the statistical set updating system 104A. The selective modification(s) can be made by way of any suitable interfacing with the statistical set updating system 104A. For example, a user entity can access one or more wired/wireless input devices of the statistical set updating system 104A to enable the interfacing.

As will be appreciated, each of the additional systems of the plurality of additional systems determined by the selecting component 122 can be and/or can have associated therewith a respective statistical set updating system (e.g., the additional statistical set updating systems 104B and 104C). Further, although the additional systems 104B and 104C each are statistical set updating systems, it will be understood that an additional system selected by the selecting component 122 can comprise and/or be able to access a compatible additional statistical set but not also be a statistical set updating system.

Further, each of the statistical set updating system 104A and the pair of additional statistical set updating systems 104B and 104C are decentralized from one another, although it will be appreciated that in one or more embodiments, one or more additional systems can be centralized relative to one or more other of the one or more additional systems. That is, as indicated above, separate systems can include unique, secure and/or private aspects of data that are not shared with one another. These separate systems can be comprised by separate institutions, for example, such as separate banks or hospitals, that have computer systems decentralized relative to one another.

To facilitate the selection of the additional system and/or statistical set, the selecting component 122 can employ a randomization pattern. The randomization pattern can be implemented via a randomization algorithm 140 associated with the selecting component 122. It will be appreciated that the randomization algorithm 140 and/or instructions for implementing the randomization algorithm 140, can be stored at the selecting component 122, memory 116, and/or an external memory/storage, accessible via an associated cloud computing environment and/or the like. Generally, the randomization algorithm 140 can facilitate determining the comprehensive set of compatible statistical sets from the selecting component 122 and can randomly select one additional statistical set of the available plurality of additional statistical sets with which to compute an averaged statistical set from, i.e. from an averaging of the statistical set 110A and the selected additional statistical set. The randomization algorithm 140 also can facilitate selecting a respective selected additional system, associated with the selected additional statistical set, with which the statistical set updating system 104A should communicate to obtain the selected additional statistical set. The pair of the statistical set updating system 104A and the selected additional system can thus be a communicating subset of the comprehensive set of systems.

The randomization pattern employed by the randomization algorithm 140 can be written and/or otherwise constructed to utilize any suitable random selection technique, such as simple random selection, stratified random selection, cluster random selection and/or systematic random selection. Randomization can occur at any level of granularity such as, but not limited to: among all statistical sets of the comprehensive set of all statistical sets; among only one or more groups of statistical sets, where the statistical sets within each group and/or the number of groups are randomly and/or selectively determined; among only two or more statistical sets of one or more groups; and/or any combination thereof.

Randomization can be different among one or more levels of granularity, groups and/or one or more subsets of the groups. Differences in randomization can include use of a different, aforementioned random selection technique and/or can include one or more randomly or selectively determined limits on communication among nodes (e.g., learners) of a comprehensive set of all nodes having one or more systems of the aforementioned comprehensive set of systems (e.g., including the statistical set updating system 104A and the additional statistical set updating systems 104B and 104C). For example, a limit can be set with regards to what nodes are enabled to communicate with one another. For example, all nodes of the comprehensive set of nodes can be randomly and/or selectively distributed within a communication topology figuratively represented as a decentralized pattern, such as a ring or other suitable connection pattern. The arrangement can be constructed by the statistical set updating system 104A, such as by the selecting component 122, and/or by one or more of the additional systems of the comprehensive set of systems comprised by the comprehensive nodes. For example, the communication topology can be a ring within which each node can communicate with each other node. See, e.g., the communication topology illustrated at FIG. 2, to be discussed in further detail below. In another example, the communication topology can be a ring within which each node can communicate with less than all other nodes. The aforementioned selective determinations can be made by a user entity by way of any suitable interfacing with the statistical set updating system 104A. For example, a user entity can access one or more wired/wireless input devices of the statistical set updating system 104A to enable the interfacing.

It also will be appreciated that the randomization pattern of the randomization algorithm 140 can change at a randomly or selectively determined frequency, such as, but not limited to: every iteration; every x-number of iterations where x can be any suitable number less than or greater than an epoch; every epoch and/or every y-number of epochs where y can be any suitable number; upon reaching a randomly or selectively determined convergence rate of the statistical set 110A and/or a selected percentage of similarity (e.g., of complete consensus) of the statistical set 110A as compared to a complete convergence among the statistical set 110A and the plurality of additional statistical sets (e.g., additional statistical sets 110B and 110C) (e.g., as determined by the monitoring component 126, to be described below in further detail); and/or any combination thereof.

The aforementioned selective determinations can be made by a user entity by way of any suitable interfacing with the statistical set updating system 104A. For example, a user entity can access one or more wired/wireless input devices of the statistical set updating system 104A to enable the interfacing. As indicated above, this change in the randomization pattern employed by the randomization algorithm 140 can include a change in an order of communication among the statistical set updating system 104A and the plurality of additional systems. For example, the figurative shape of the communication topology can be changed and/or an aforementioned limit changed with respect to the communication topology. In another example, the levels at which randomization can occur can themselves be reconstructed.

Turning next to the computing component 124, the component can receive an indication of the selected additional statistical set and associated selected additional system by any suitable method of communication with the selecting component 122. The computing component 124 then can average the statistical set 110A with the selected additional statistical set. The averaging computation can be performed via a computation algorithm 142. In one instance, the averaging computation can be conducted under a doubly stochastic matrix for convergence guarantee, with the sum of the weights among the plurality of involved systems being one. For example, [0.3, 0.4, 0.3] for a 3-system averaging. It will be appreciated that the computation algorithm 142 and/or instructions for implementing the computation algorithm 142, can be stored at the computing component 124, memory 116 and/or external memory/storage, accessible via an associated cloud computing environment and/or the like.

The averaging computation performed can result in an updated statistical set. That is, upon an initial iteration comprising the statistical set 110A, the statistical set 110A itself is modified and/or replaced, and thus can become an updated statistical set 110A. Accordingly, as used herein, the terms statistical set 110A and updated statistical set 110A can be used interchangeably. Likewise, the terms statistical set 110B or 110C can be used interchangeably, respectively, with the terms updated statistical set 110B and 110C.

It will be appreciated that the selecting component 122 can perform more than one selection at a rate that can be other than 1-to-1 with the computation performed by the computing component 124 for each of the selections made by the selecting component 122. Additionally and/or alternatively, it will be appreciated that the operations performed by the selecting component 122 and the computing component 124 can be scaled where suitable, such as where processing power and/or memory to perform the associated operations is available. For example, the selecting component 122 and/or computing component 124 can be instructed, such as by the user entity interfacing with the statistical set updating system 104A as aforementioned, to perform two or more iterations of the aforementioned processes performed by these components at least partially concurrently with the base iteration (i.e., the selecting and computing operations discussed above). The number of iterations at least partially concurrently performed can be limited by the available processing power and/or memory available to the statistical set updating system 104A. The related determination can be made by any suitable monitoring of one or more performance aspects of the statistical set updating system 104A. For sake of brevity, the performance monitoring is not further discussed herein, although one having ordinary skill in the art will have an understanding of performance monitoring of a computer system to construct a respective computer system having the aforementioned performance monitoring capabilities.

Turning next to the monitoring component 126, this component can monitor and compare the updated statistical set 110A with the comprehensive set of compatible and available additional statistical sets, any of which themselves can be an updated statistical set at any given time. That is, one or more of the additional systems also is performing respective selecting and computing operations as least partially concurrently and/or subsequently relative to the respective selecting and computing operations performed by the statistical set updating system 104A (e.g., by a respective selecting component and computing component). The monitoring performed by the monitoring component 126 can employ any suitable technique to make the related statistical set comparison and associated determination of convergence rate of the statistical set 110A and/or percentage of similarity (e.g., of complete consensus) of the statistical set 110A as compared to a complete convergence among the statistical set 110A and the plurality of additional statistical sets (e.g., additional statistical sets 110B and 110C). It will be appreciated that full convergence can be unwanted, and thus monitoring the convergence rate to consensus to avoid issues such as overfitting can be employed.

The monitoring by the monitoring component 126 can be employed at any suitable frequency. For example, the monitoring by the monitoring component 126 can detect availability of the updated statistical sets at the respective memories after each computation is completed.

A suitable stop-gate of the selecting and computing processes (e.g., by the selecting component 122 and the computing component 124) can be selectively provided to the statistical set updating system 104A (e.g., to the monitoring component 126), such as by a user entity. The stop-gate can be provided via any suitable interfacing with the statistical set updating system 104A. For example, a user entity can access one or more wired/wireless input devices of the statistical set updating system 104A to enable the interfacing and thus to enable input of a suitable stop-gate. The stop-gate can comprise a selected convergence rate of the statistical set 110A and/or a threshold consensus, such as a selected percentage of similarity (e.g., of complete consensus) of the statistical set 110A as compared to a complete convergence among the statistical set 110A and the plurality of additional statistical sets (e.g., additional statistical sets 110B and 110C).

In one example, the monitoring component 126 can monitor a loss of an objective function relative to the underlying data. That is, a graphed plateau of the loss versus updating epochs completed can indicate a level of convergence. Additionally and/or alternatively, the monitoring component 126 can monitor for a loss threshold. Such loss threshold can be default and/or selectively determined by an entity.

Until the selected stop-gate is reached, the monitoring component 126 can continue to provide indication to the selecting component 122 and to the computing component 124 to continue to perform additional iterations of their respective operations. For example, in one embodiment, the computing component 124 can average the updated statistical set with yet another additional statistical set that is compatible with the updated statistical set. That is, as indicated above, upon an initial iteration comprising the statistical set 110A, the statistical set 110A itself is modified and/or replaced, and thus can become an updated statistical set 110A. The averaging and/or training with one or more yet other additional statistical sets thereby enables computation of one or more further iterations of the updated statistical set 110A (e.g., via the computing component 124) that can be closer to a statistical set consensus than the most previously computed updated statistical set 110A. As indicated above, this closeness can be determined by the monitoring component 126 among the comprehensive set of statistical sets (e.g., the statistical set 110A and the additional statistical sets 110B and 110C) comprised by the comprehensive set of systems (e.g., the statistical set updating system 104A and the plurality of additional statistical set updating systems 104B and 104C).

As will be understood by one having ordinary skill in the art, the yet another additional statistical set can be obtained from yet another selected additional system of the aforementioned plurality of additional systems (e.g., via the selecting component 122). Furthermore, for each iteration, a learner (e.g., a system such as the statistical set updating system 104A of the expanded non-limiting system 100B), can communicate with a pair of the additional systems or more.

The interfacing component 128 can provide an indication to the user entity to indicate, at any suitable frequency, progress being made by the statistical set updating system 104A. That is, indication can be provided to the user entity, such as in the form of a numerical quantity representing one or more of a present convergence rate of the statistical set 110A and/or a selected percentage of similarity (e.g., of complete consensus) of the statistical set 110A as compared to a complete convergence among the statistical set 110A and the plurality of additional statistical sets (e.g., additional statistical sets 110B and 110C).

This interfacing by the interfacing component 128 can be performed by way of any suitable interfacing with the statistical set updating system 104A. For example, a user entity can access one or more wired/wireless input devices of the statistical set updating system 104A to enable the interfacing.

Further, it will be appreciated that the processes discussed above as being performed by one or more of the components of the statistical set updating system 104A alternatively can be performed by one or more alternative components in one or more other embodiments. That is, the software and/or hardware comprised and/or utilized by any one or more component of the statistical set updating system 104A can instead be comprised and/or utilized by a different one or more components of a respective alternative embodiment of the statistical set updating system 104A.

Figure 2:
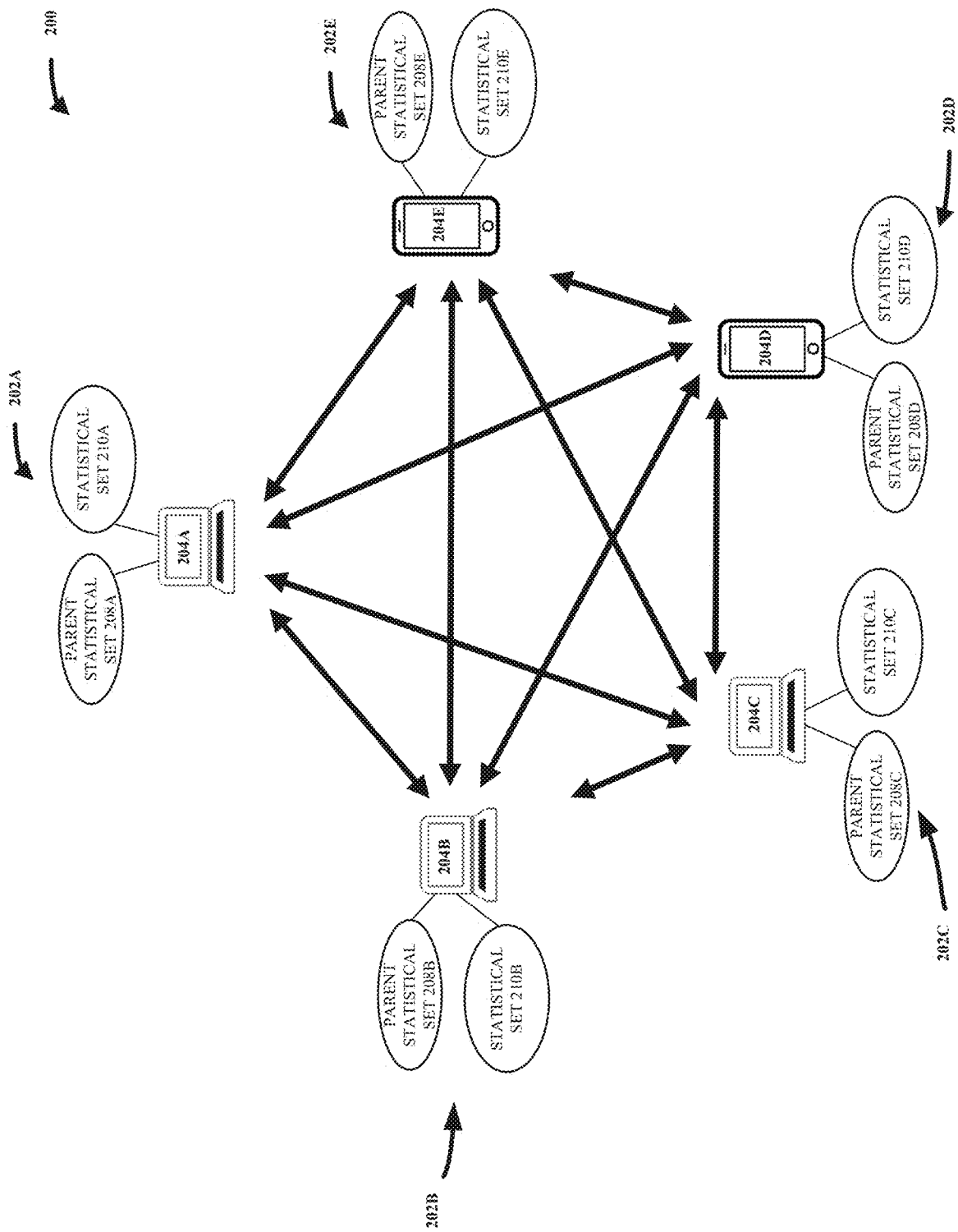
FIG. 2 illustrates a diagram of an example, non-limiting system that can facilitate updating, such as averaging and/or training, of a statistical set, in accordance with one or more embodiments described herein.
Figure 3:
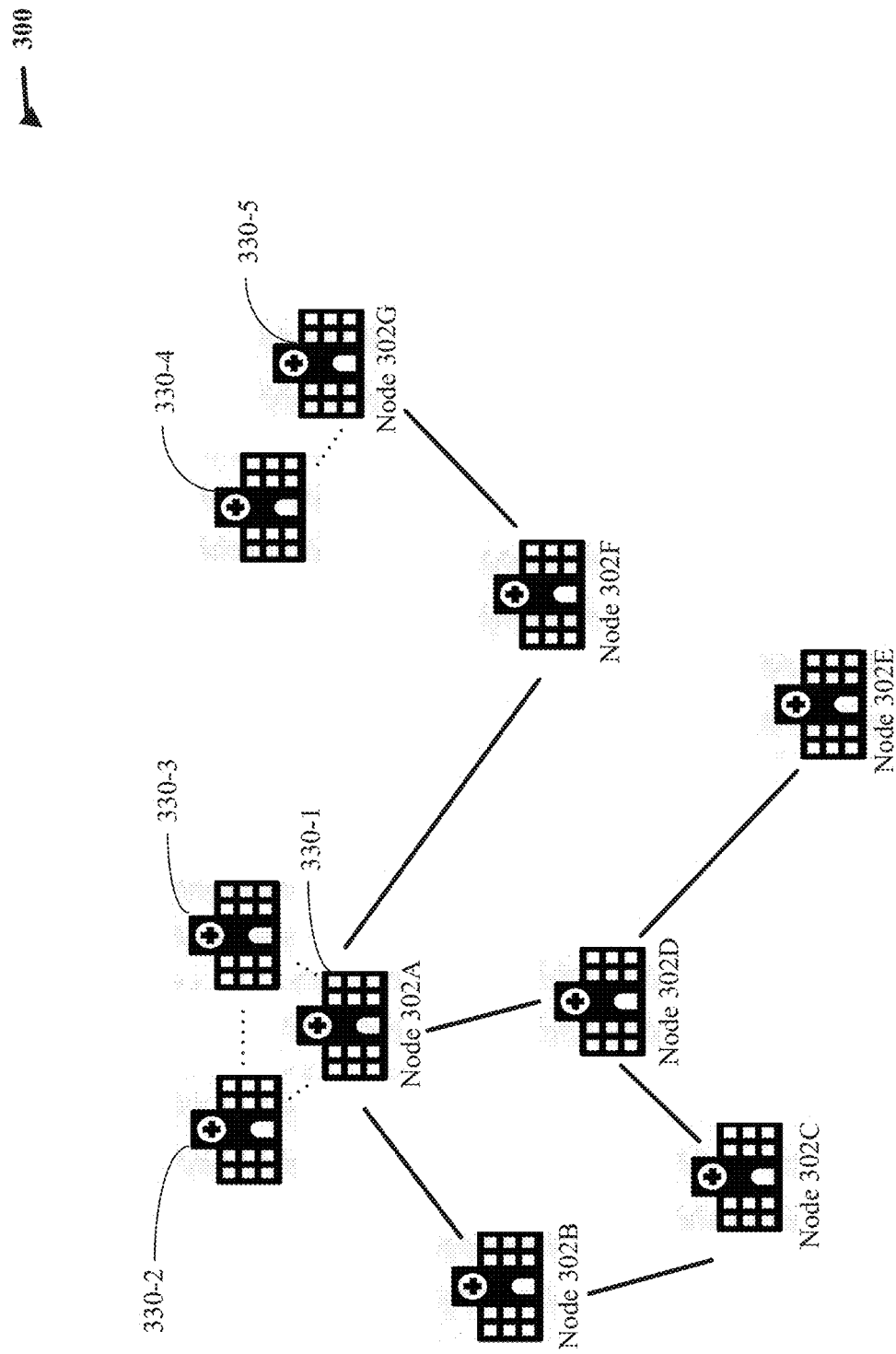
FIG. 3 illustrates a diagram of another example, non-limiting system that can facilitate updating, such as averaging and/or training, of a plurality of statistical sets, in accordance with one or more embodiments described herein.

Turning next to FIGS. 2 and 3, a pair of example communication topologies are provided to diagrammatically illustrate processes of randomized distributed updating performed by one or more embodiments described herein. Repetitive description of like elements and/or processes employed in respective embodiments is omitted for sake of brevity.

Looking first to FIG. 2, the figure illustrates a diagram of an example, non-limiting system 200 that can perform randomized distributed updating of a plurality of statistical sets. The non-limiting system 200 can comprise a comprehensive set of nodes 202A, 202B, 202C, 202D and 202E. These nodes can respectively comprise a comprehensive set of statistical set updating systems 204A, 204B, 204C, 204D and 204E each being cable of performing randomized distributed updating of one or more statistical sets. These statistical set updating systems can have respectively associated therewith a respective statistical set 210A, 210B, 210C, 210D and 210E of a comprehensive set of statistical sets. In one or more embodiments, these systems additionally can have respectively associated therewith a respective parent statistical set 208A, 208B, 208C, 208D and 208E.

The statistical set updating systems 204A, 204B, 204C, 204D and 204E can be distributed within a communication topology illustrated as a ring, such as a closed ring. Referring to the statistical set updating system 204A, but applicable to any of the additional statistical set updating systems 204B, 204C, 204D and 204E, the statistical set updating system 204A can perform randomized distributed updating of one or more statistical sets. Communication among the statistical set updating systems 204A, 204B, 204C, 204D and 204E is not fixed. A statistical set 210A can be updated with any of the additional statistical sets 210B, 210C, 210D or 210E. Accordingly, for statistics from an updated statistical set 210A to reach either of statistical set updating system 204C or 204D, only one iteration of updating, such as averaging of statistics, is performed. Accordingly, time to reach consensus and convergence rate for the non-limiting system 200 and the respective statistical set updating system 204A can be faster as compared to a conventional embodiment employing a fixed communication topology. That is, as described with reference to one or more components or aspects illustrated in FIG. 1, a respective selecting component of the statistical set updating system 204A can utilize a respective randomization algorithm to update the statistical set 210A with whichever of the additional statistical sets 210B, 210C, 210D or 210E is selected by the respective selecting component for each computation iteration by the respective computing component.

Still referring to FIG. 2, and to the non-limiting system 200, an example algorithm employed by the statistical set updating systems 204A, 204B, 204C, 204D and 204E is provided below. In the example algorithm, a statistical set, for example an ML model utilized for providing one or more gradients, can be updated among a plurality of distributed learners, i.e. the statistical set updating systems 204A, 204B, 204C, 204D and 204E. As a result, an updated final ML model can be produced, which is the average of the ML models from all learners, l. With respect to the example algorithm, any one or more embodiments of a randomization algorithm discussed herein, such as the randomization algorithm 140, can be utilized to randomly select the communication sub-graph, as provided in the example algorithm below.

EXAMPLE ALGORITHM

Input: Same initial local model $\omega_0^{(l)} = \omega_0$; local batch size M; total number of iterations K; learning rate schedule $\{\alpha_k\}$.
for k = 1: K do
    // for each learner l
    Run concurrently:
        Gradient computation
        Sample a mini-batch of size M;
        Use the current local model $\omega_k^{(l)}$ to compute gradient $$g_k = \frac{1}{M}\sum_{m=1}^{M}\nabla f(\omega_k^{(l)}; \xi_{k,m}^{(1)});$$

Statistical set averaging
            Select a statistical set for averaging (e.g., model parameters)
            Randomly select a communication sub-graph for averaging ($T_k = [t_{ij}^k]$)
            Average the statistical set among the learners in the sub-graph
    Local model update $$\omega_{k+1}^{(l)} = \omega_{k+\frac{1}{2}}^{(l)} - \alpha_k g_k^{(l)};$$

end
Output the final model as the average of models from all learners $$\omega_K = \frac{1}{L}\sum_{l=1}^{L}\omega_K^{(l)}.$$

Looking now to FIG. 3, the figure illustrates a diagram of an example, non-limiting system 300 that can perform randomized distributed updating of a plurality of statistical sets. The non-limiting system 300 can comprise a comprehensive set of nodes 302A, 302B, 302C, 302D, 302E, 302F and 302G. These nodes can respectively comprise a comprehensive set of systems statistical set updating systems being cable of performing randomized distributed updating of one or more statistical sets. The updating can be performed asynchronously.

One or more nodes can include one or more systems (e.g., statistical set updating systems). In one or more examples, this can be because one or more nodes can include various communicating and/or otherwise connected institutions, such as hospitals. As shown, node 302A includes institutions 330-1, 330-2 and 330-3. Also as shown, node 302G includes institutions 330-4 and 330-5. The nodes 302A, 302B, 302C, 302D, 302E, 302F and 302G are arranged in a communication topography where not all nodes are communicatively connected with all other nodes. Nonetheless, statistical set updating at any one node can still take place with respect to additional statistical sets obtained from communicating (e.g., adjacent) neighbor nodes.

Like the embodiments of FIGS. 1B and 2, the various nodes 302A, 302B, 302C, 302D, 302E, 302F and 302G (e.g., institutions) can have underlying data that is to be non-shared, such as due to one or more contracts, regulations, laws (e.g., HIPAA) and/or customs. That is, the respective parent statistical sets and the respective underlying data comprised by the various nodes are not shared with one another. Rather, only respective statistical sets at each node (e.g., generated from respective parent statistical sets) are shared. In this way, a third party looking to wrongfully obtain the various underlying data(s) cannot intrude into one node to obtain underlying data or a parent statistical set from another node. Rather, such ill-intentioned third party only can intrude into each of the nodes separately to obtain all such underlying data and parent statistical sets, thereby providing a level of security and/or legal/regulatory/contractual compliance regarding the underlying data.

Figure 4:
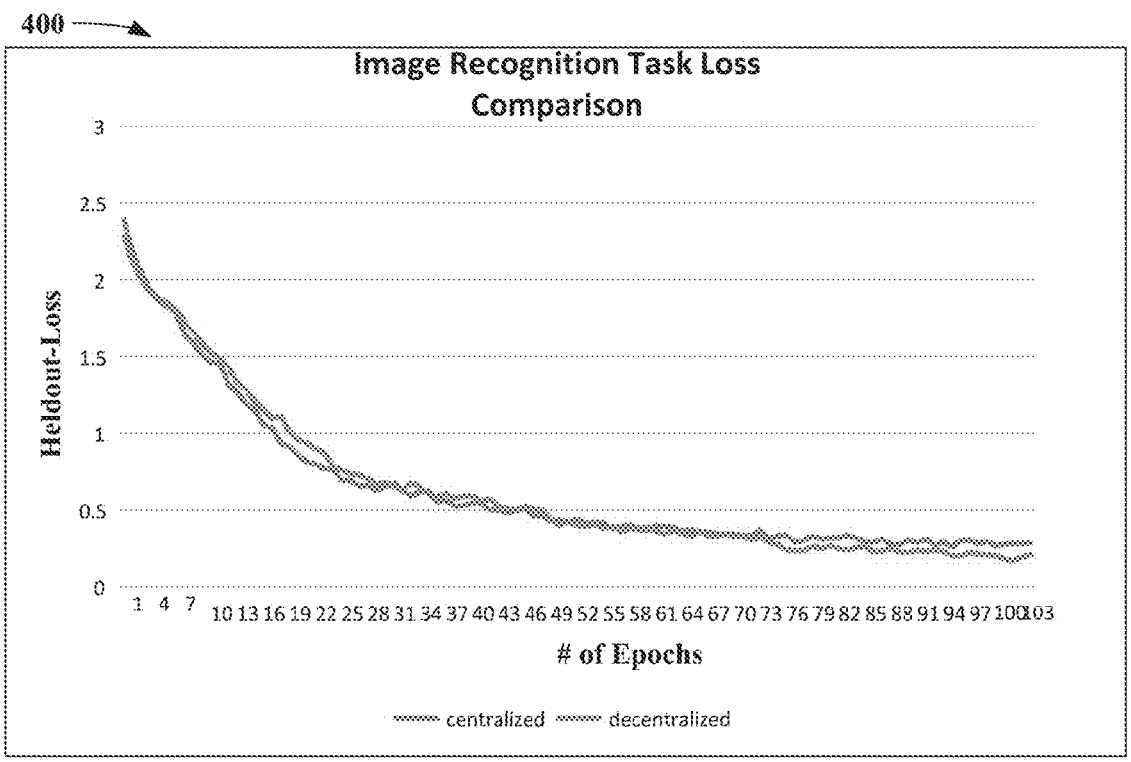
FIG. 4 illustrates a graph showing holdout loss versus number of epochs of statistical set averaging completed, in accordance with one or more embodiments described herein.
Figure 5:
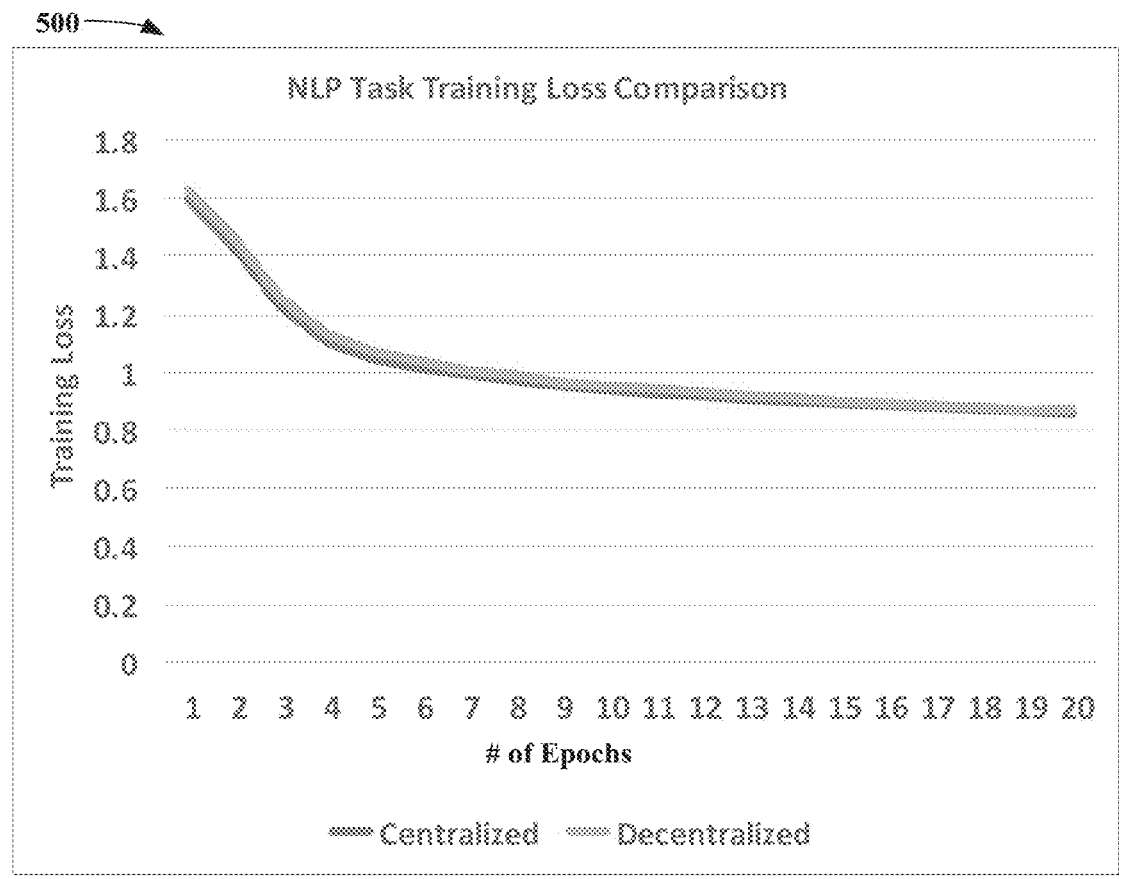
FIG. 5 illustrates another graph showing holdout loss versus number of epochs of statistical set averaging completed, in accordance with one or more embodiments described herein.

Turning next to FIGS. 4 and 5, a plurality of data is illustrated demonstrating exemplary convergence of a statistical set of a statistical set updating system of a comprehensive set of centralized systems as compared to exemplary convergence of a statistical set of a statistical set updating system of a comprehensive set of decentralized systems. As illustrated at FIG. 4, heldout-loss is graphed against # of epochs of updating performed and/or completed of the respective statistical sets with respect to image recognition task training. As demonstrated at FIG. 4, heldout-loss for the decentralized systems lowers and plateaus at a faster rate than heldout-loss of the centralized systems. As illustrated at FIG. 5, training loss is graphed against # of epochs of updating performed and/or completed of the respective statistical sets with respect to natural language processing (NLP) task training. As demonstrated at FIG. 5, training loss for the decentralized systems is similar to, and indeed nearly the same as, training loss for the centralized systems.

Figure 6:
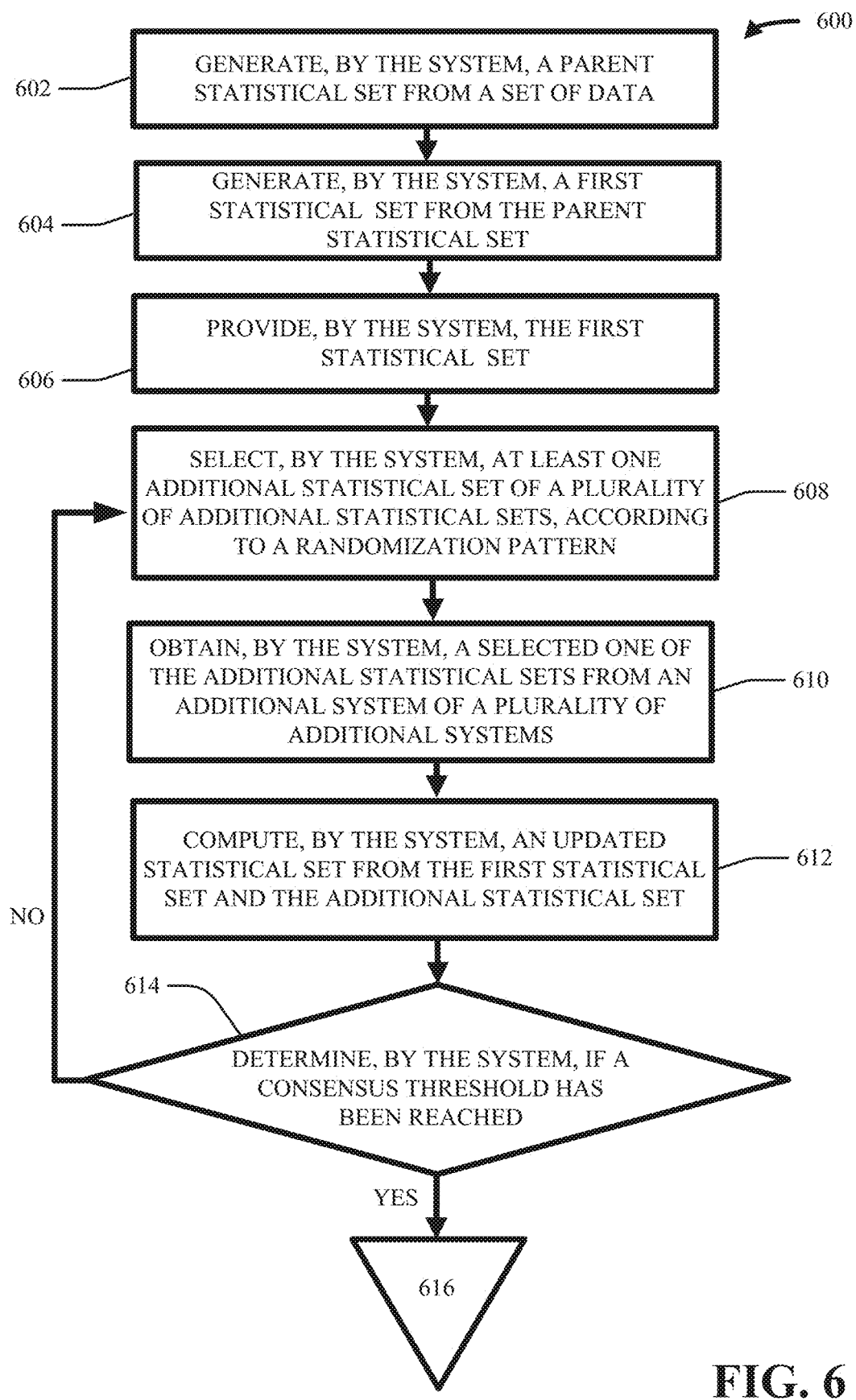
FIG. 6 illustrates a flow diagram of an example, non-limiting computer-implemented method that can facilitate updating, such as averaging and/or training, of a statistical set, in accordance with one or more embodiments described herein.
Figure 7:
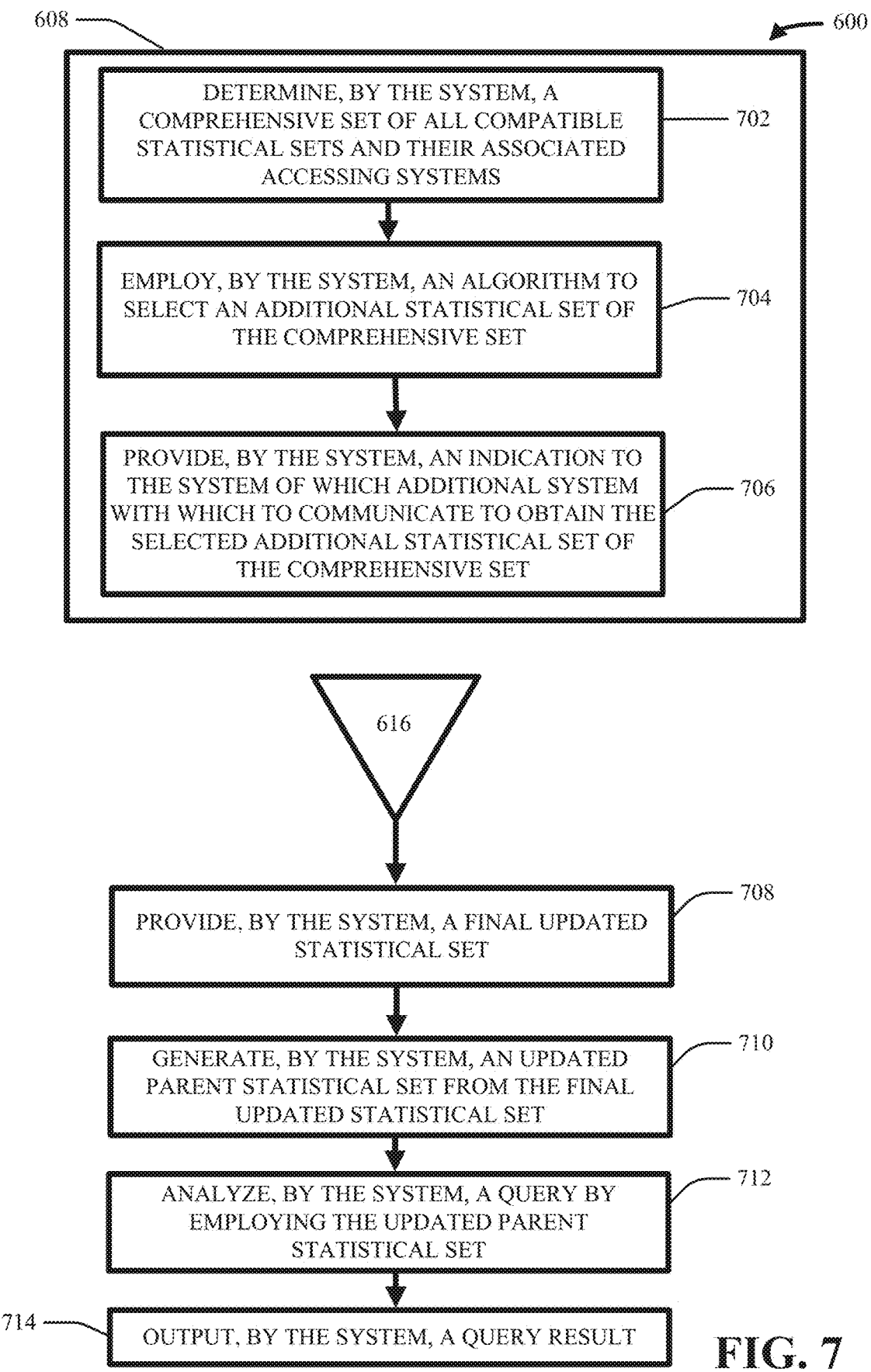
FIG. 7 illustrates a continuation of the flow diagram of FIG. 6 of an example, non-limiting computer-implemented method that can facilitate updating, such as averaging and/or training, of a statistical set, in accordance with one or more embodiments described herein.

Referring next to FIGS. 6 and 7, these figures together illustrate a flow diagram of an example, non-limiting computer-implemented method 600 that can facilitate the updating, such as training, of one or more statistical sets, in accordance with one or more embodiments described herein. Repetitive description of like elements and/or processes employed in respective embodiments is omitted for sake of brevity.

Looking first to 602 at FIG. 6, the non-limiting computer-implemented method 600 can comprise generating, by the system (e.g., via statistical set updating system 104A and/or generating component 121), operatively coupled to a processor (e.g., processor 118, a quantum processor and/or the like), a parent statistical set (e.g., parent statistical set 108A), such as from a set of raw data (e.g., to be underlying data).

Looking to 604, the non-limiting computer-implemented method 600 can comprise generating, by the system (e.g., via statistical set updating system 104A and/or generating component 121), a statistical set (e.g., statistical set 110A), such as from a parent statistical set (e.g., parent statistical set 108A).

Looking to 606, the non-limiting computer-implemented method 600 can comprise providing, by a system (e.g., via statistical set updating system 104A and/or obtaining component 120) of the statistical set (e.g. the statistical set 110A).

At 608, the non-limiting computer-implemented method 600 can comprise selecting, by the system (e.g., via statistical set updating system 104A and/or selecting component 122) at least one additional statistical set (e.g., additional statistical set 110B or 110C) of a plurality of additional statistical sets, according to a randomization pattern, such as via a respective algorithm (e.g., randomization algorithm 140).

At 610, the non-limiting computer-implemented method 600 can comprise obtaining, by the system (e.g., via statistical set updating system 104A, selecting component 122, computing component 124 and/or computation algorithm 142), the selected additional statistical set (e.g., additional statistical set 110B or 110C) from an additional system (e.g., additional statistical set updating system 104B or 104C) of a plurality of additional systems (e.g., including additional statistical set updating systems 104B and 104C).

At 612, the non-limiting computer-implemented method 600 can comprise computing, by the system (e.g., via statistical set updating system 104A, computing component 124 and/or computation algorithm 142), an updated statistical set (e.g., an updated statistical set 110A, such as replacing the non-averaged statistical set 110A) from the statistical set (e.g., non-averaged statistical set 110A) and the selected additional statistical set (e.g., non-averaged or updated additional statistical set 110B or 110C).

At 614, the non-limiting computer-implemented method 600 can comprise determining, by the system (e.g., via statistical set updating system 104A and/or monitoring component 126), if a consensus threshold has been reached among the now-averaged statistical set (e.g., updated statistical set 110A) and the plurality of additional statistical sets (e.g., additional statistical set 110B or 110C). If the consensus threshold has been reached, the method can proceed to continuation triangle 616. If the consensus threshold has not been reached, the method can proceed backwards to repeat numerous blocks. The selecting block 608, obtaining block 610, computing block 612 and determining block 614 can continue to repeat until the consensus threshold has been met. As described above, the consensus threshold can be a percentage of consensus among the statistical sets (e.g., statistical set 110A and additional statistical sets 110B and 110C) that is not equal to a full 100% consensus. Additionally, upon additional iterations of the determining block 614, selecting block 608, obtaining block 610 and computing block 612, the now-averaged statistical set and the additional statistical sets can continue to be further updated, e.g., averaged and/or trained, and thus can be referred to, respectively, as an updated statistical set and as additional updated statistical sets.

Turning now to FIG. 7, the non-limiting computer-implemented method 600 is continued via connection at the continuation triangle 616. Additionally, processes performed as part of the obtaining block 608 also are illustrated. Repetitive description of like elements and/or processes employed in respective embodiments is omitted for sake of brevity.

Turning first to the processes performed as part of the obtaining block 608, blocks, 702, 704 and 706 are illustrated.

At 702, the non-limiting computer-implemented method 600 can comprise determining, by the system (e.g., via statistical set updating system 104A and/or selecting component 122) a comprehensive set of all compatible statistical sets (e.g., including the statistical set 110A and the additional statistical sets 110B and 110C) and their associated accessing systems (e.g., including the statistical set updating system 104A and the additional statistical set updating systems 104B and 104C).

At 704, the non-limiting computer-implemented method 600 can comprise employing, by the system (e.g., via statistical set updating system 104A and/or selecting component 122) an algorithm (e.g., randomization algorithm 140) to select an additional statistical set (e.g., additional statistical set 110B or 110C) of the comprehensive set (e.g., including the statistical set 110A and the additional statistical sets 110B and 110C).

At 706, the non-limiting computer-implemented method 600 can comprise providing, by the system (e.g., via statistical set updating system 104A and/or selecting component 122) an indication to the system (e.g., via statistical set updating system 104A and/or computing component 124) of which additional system (e.g., additional statistical set updating system 104B or 104C) with which to communicate to obtain the selected additional statistical set (e.g., additional statistical set 110B or 110C).

Description now turns to the direct continuation of the non-limiting computer-implemented method illustrated at FIG. 6 and thus to the continuation triangle 616.

At 708, the non-limiting computer-implemented method 600 can comprise providing, by the system (e.g., via statistical set updating system 104A and/or interfacing component 128) a final updated statistical set after one or more iterations of averaging are completed.

At 710, the non-limiting computer-implemented method 600 can comprise generating, by the system (e.g., via statistical set updating system 104A and/or generating component 121) an updated parent statistical set (e.g., updated parent statistical set 108A) from the final updated statistical set (e.g., final updated statistical set 110A).

At 712, the non-limiting computer-implemented method 600 can comprise analyzing, by the system (e.g., via statistical set updating system 104A and/or computing component 124) a query by employing the updated parent statistical set (e.g., updated parent statistical set 108A). For example, the updated parent statistical set can be an analytical model.

At 714, the non-limiting computer-implemented method 600 can comprise outputting, by the system (e.g., via statistical set updating system 104A and/or interfacing component 128) a query result in response to the employ of the parent statistical set (e.g., analytical model).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

In the examples above, it also should be appreciated that statistical set updating system 104A and/or expanded non-limiting system 100B can enable scaled updating of more than one set of statistical sets. For example, in the software technical support domain, statistical set updating system 104A can enable scaling technician skills, as technicians in this domain can employ statistical set updating system 104A to update statistical sets, such as to train numerous different ML models.

As also will be appreciated, the statistical set updating systems discussed above (e.g., 104, 104A and 204A-E) and/or non-limiting systems discussed above (e.g., 100A, 100B, 200 and 300) can provide a new approach driven by asynchronous and distributed updating combined with non-sharing of underlying data. For example, two or more statistical set updating systems can provide updating separately and dependently relative to one another, such as at least partially in parallel. Further, the two or more statistical set updating systems can have underlying data that is to be non-shared, such as due to one or more contracts, regulations, laws (e.g., HIPAA) and/or customs. That is, the respective parent statistical sets and the respective underlying data comprised by the two or more statistical set updating systems are not shared with one another. Rather, only respective statistical sets at each of the two or more statistical set updating systems (e.g., generated from respective parent statistical sets) are shared. In this way, a third party looking to wrongfully obtain the various underlying data(s) cannot intrude into just one of the two or more statistical set updating systems to obtain underlying data or a parent statistical set from another and/or all of the two or more statistical set updating systems. Rather, such ill-intentioned third party only can intrude into each of the two or more statistical set updating systems separately to obtain all such underlying data and parent statistical sets, thereby providing a level of security and/or legal/regulatory/contractual compliance regarding the underlying data.

As also will be appreciated, the statistical set updating systems discussed above (e.g., 104, 104A and 204A-E) and/or non-limiting systems discussed above (e.g., 100A, 100B, 200 and 300) can provide a new approach driven by previously unincorporated randomization of distributed updating. For example, statistical set updating system 104A and/or expanded non-limiting system 100B can provide a new approach to quickly and/or automatically update one or more statistical sets without constituent feedback. In an example, statistical set updating system 104A can provide an approach to scale updating of two or more sets of statistical sets concurrently. In an example, statistical set updating system 104A can provide a new approach for selective control of the statistical set updating system 104A with respect to the randomization pattern employed, such as allowing for specialization relative to a respective system of nodes. In an example, statistical set updating system 104A can provide a new approach for: quickly freeing up processing power and/or memory at the statistical set updating systems involved; increasing a convergence rate to consensus of the statistical sets being updated decreasing communication cost among the statistical set updating systems involved; utilizing fewer iterations of updating; and/or quickly freeing up processing power and/or memory at the statistical set updating systems involved, as regards systems not employing a statistical set updating system as described herein.

The statistical set updating systems discussed above (e.g., 104, 104A and 204A-E) and/or non-limiting systems discussed above (e.g., 100A, 100B, 200 and 300) can provide technical improvements to a processing unit associated with these statistical set updating systems. For example, in performing the above-described randomized distributed updating of a plurality of statistical sets, statistical set updating system 104A can increase the speed of computation and/or lower the communication cost associated with updating of a plurality of statistical sets by a respective system. Accordingly, by this example, the statistical set updating system 104A can thereby facilitate improved performance, improved efficiency and/or reduced computational cost associated with a processing unit (e.g., processor 118) employing the statistical set updating system 104A. Additionally, in view of the randomized statistical set updating employed by the statistical set updating system 104A, noise can be reduced enabling the statistical set updating system 104A to find a more robust local optimum in a respective optimization landscape, as compared to available updating methods, such as those utilizing fixed statistical set updating. That is, the statistical set updating system 104A can have better generalization, therefore reducing a degree of overfitting.

A practical application of the statistical set updating systems discussed above (e.g., 104, 104A and 204A-E) and/or non-limiting systems discussed above (e.g., 100A, 100B, 200 and 300) is that it these systems can be implemented in one or more domains to enable scaled and secure updating of more than one set of statistical sets. For example, a practical application of statistical set updating system 104A is that it can be implemented in the software technical support domain, such that a technician therein can employ statistical set updating system 104A to asynchronously update two or more decentralized statistical sets absent concern regarding sharing of separate underlying datas upon which the statistical sets are indirectly and/or directly based.

Statistical set updating systems discussed above (e.g., 104, 104A and 204A-E) and/or non-limiting systems discussed above (e.g., 100A, 100B, 200 and 300) can employ hardware and/or software to solve problems that are highly technical in nature (e.g., related to automated updating of statistical sets, such as averaging of statistical sets or such as training of ML models), that are not abstract, and that cannot be performed as a set of mental acts by a human. For example, a human, or even thousands of humans, cannot efficiently, accurately and/or effectively manually update statistical sets, such as average statistical sets or train ML models.

In one or more embodiments, one or more of the processes described herein can be performed by one or more specialized computers (e.g., a specialized processing unit, a specialized classical computer, a specialized quantum computer and/or another type of specialized computer) to execute defined tasks related to the various technologies identified above. Statistical set updating systems discussed above (e.g., 104, 104A and 204A-E) and/or components thereof, can be employed to solve new problems that arise through advancements in technologies mentioned above, employment of quantum computing systems, cloud computing systems, computer architecture and/or another technology.

It is to be appreciated that statistical set updating systems discussed above (e.g., 104, 104A and 204A-E) and/or non-limiting systems discussed above (e.g., 100A, 100B, 200 and 300) can utilize various combinations of electrical components, mechanical components and/or circuitry that cannot be replicated in the mind of a human and/or performed by a human, as the various operations that can be executed by statistical set updating system 104A and/or components thereof as described herein are operations that are greater than the capability of a human mind. For instance, the amount of statistics processed, the speed of processing the statistics and/or the types of statistics processed by statistical set updating system 104A over a certain period of time can be greater, faster and/or different than the amount, speed and/or statistics type that can be processed and/or comprehended by a human mind over the same period of time.

According to one or more embodiments, statistical set updating systems discussed above (e.g., 104, 104A and 204A-E) and/or non-limiting systems discussed above (e.g., 100A, 100B, 200 and 300) also can be fully operational towards performing one or more other functions (e.g., fully powered on, fully executed and/or another function) while also performing the various operations described herein.

In order to provide additional context for various embodiments described herein, FIG. 8 and the following discussion are intended to provide a brief, general description of a suitable operating environment 800 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures and/or the like that perform particular tasks and/or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, handheld computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located both in local and remote memory storage devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, disk storage and/or other magnetic storage devices, solid state drives and/or other solid state storage devices, and/or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, but not limitation, communication media can include wired media, such as a wired network and/or direct-wired connection, and/or wireless media such as acoustic, RF, infrared and/or other wireless media.

With reference again to FIG. 8, the example operating environment 800 for implementing various embodiments of the aspects described herein includes a computer 802, the computer 802 including a processing unit 804, a system memory 806 and/or a system bus 808. The system bus 808 can couple system components including, but not limited to, the system memory 806 to the processing unit 804. The processing unit 804 can be any of various commercially available processors. Dual microprocessors and/or other multi-processor architectures can be employed as the processing unit 804.

The system bus 808 can be any of one or more types of bus structure that can further interconnect to a memory bus (with or without a memory controller), a peripheral bus and/or a local bus using any of a variety of commercially available bus architectures. The system memory 806 can include ROM 810 and/or RAM 812. A basic input/output system (BIOS) can be stored in a non-volatile memory such as ROM, erasable programmable read only memory (EPROM) and/or EEPROM, which BIOS contains the basic routines that help to transfer information among elements within the computer 802, such as during startup. The RAM 812 can also include a high-speed RAM, such as static RAM for caching data.

The computer 802 further can include an internal hard disk drive (HDD) 814 (e.g., EIDE, SATA), one or more external storage devices 816 (e.g., a magnetic floppy disk drive (FDD), a memory stick or flash drive reader, a memory card reader and/or the like) and/or a drive 820, e.g., such as a solid state drive or an optical disk drive, which can read or write from a disk 822, such as a CD-ROM disc, a DVD, a BD and/or the like. Alternatively, where a solid state drive is involved, disk 822 could not be included, unless separate. While the internal HDD 814 is illustrated as located within the computer 802, the internal HDD 814 can also be configured for external use in a suitable chassis (not shown). Additionally, while not shown in operating environment 800, a solid state drive (SSD) could be used in addition to, or in place of, an HDD 814. The HDD 814, external storage device(s) 816 and drive 820 can be connected to the system bus 808 by an HDD interface 824, an external storage interface 826 and a drive interface 828, respectively. The HDD interface 824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 812, including an operating system 830, one or more applications 832, other program modules 834 and/or program data 836. All or portions of the operating system, applications, modules and/or data can also be cached in the RAM 812. The systems and methods described herein can be implemented utilizing various commercially available operating systems and/or combinations of operating systems.

Computer 802 can optionally comprise emulation technologies. For example, a hypervisor (not shown) or other intermediary can emulate a hardware environment for operating system 830, and the emulated hardware can optionally be different from the hardware illustrated in FIG. 8. In a related embodiment, operating system 830 can comprise one virtual machine (VM) of multiple VMs hosted at computer 802. Furthermore, operating system 830 can provide runtime environments, such as the JAVA runtime environment or the .NET framework, for applications 832. Runtime environments are consistent execution environments that allow applications 832 to run on any operating system that includes the runtime environment. Similarly, operating system 830 can support containers, and applications 832 can be in the form of containers, which are lightweight, standalone, executable packages of software that include, e.g., code, runtime, system tools, system libraries and/or settings for an application.

Further, computer 802 can be enabled with a security module, such as a trusted processing module (TPM). For instance, with a TPM, boot components hash next in time boot components and wait for a match of results to secured values before loading a next boot component. This process can take place at any layer in the code execution stack of computer 802, e.g., applied at application execution level and/or at operating system (OS) kernel level, thereby enabling security at any level of code execution.

A user entity can enter commands and information into the computer 802 through one or more wired/wireless input devices, e.g., a keyboard 838, a touch screen 840 and/or a pointing device, such as a mouse 842. Other input devices (not shown) can include a microphone, an infrared (IR)

remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices can be connected to the processing unit 804 through an input device interface 844 that can be coupled to the system bus 808, but can be connected by other interfaces, such as a parallel port, IEEE 1394 serial port, game port, USB port, IR interface, BLUETOOTH® interface and/or the like.

A monitor 846 or other type of display device can be also connected to the system bus 808 via an interface, such as a video adapter 848. In addition, a computer typically includes other peripheral output devices (not shown), such as speakers, printers and/or the like.

The computer 802 can operate in a networked environment using logical connections via wired and/or wireless communications to one or more remote computers, such as a remote computer(s) 850. The remote computer(s) 850 can be a workstation, a server computer, a router, a personal computer, portable computer, microprocessor-based entertainment appliance, a peer device and/or other common network node, and typically includes many or all of the elements described relative to the computer 802, although, for purposes of brevity, only a memory/storage device 852 is illustrated. The logical connections depicted include wired/wireless connectivity to a local area network (LAN) 854 and/or larger networks, e.g., a wide area network (WAN) 856. LAN and WAN networking environments are commonplace in offices and companies, and facilitate enterprise-wide computer networks, such as intranets, all of which can connect to a global communications network, e.g., the Internet.

When used in a LAN networking environment, the computer 802 can be connected to the local network 854 through a wired and/or wireless communication network interface or adapter 858. The adapter 858 can facilitate wired or wireless communication to the LAN 854, which can also include a wireless access point (AP) disposed thereon for communicating with the adapter 858 in a wireless mode.

When used in a WAN networking environment, the computer 802 can include a modem 860 and/or can be connected to a communications server on the WAN 856 via other means for establishing communications over the WAN 856, such as by way of the Internet. The modem 860, which can be internal or external and a wired and/or wireless device, can be connected to the system bus 808 via the input device interface 844. In a networked environment, program modules depicted relative to the computer 802 or portions thereof, can be stored in the remote memory/storage device 852. It will be appreciated that the network connections shown are example and other means of establishing a communications link among the computers can be used.

When used in either a LAN or WAN networking environment, the computer 802 can access cloud storage systems or other network-based storage systems in addition to, or in place of, external storage devices 816 as described above, such as but not limited to, a network virtual machine providing one or more aspects of storage or processing of information. Generally, a connection between the computer 802 and a cloud storage system can be established over a LAN 854 or WAN 856 e.g., by the adapter 858 or modem 860, respectively. Upon connecting the computer 802 to an associated cloud storage system, the external storage interface 826 can, with the aid of the adapter 858 and/or modem 860, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf and/or the like), and/or telephone. This can include Wireless Fidelity (Wi-Fi) and BLUETOOTH® wireless technologies. Thus, the communication can be a predefined structure as with a conventional network or simply an ad hoc communication between at least two devices.

Figure 9:
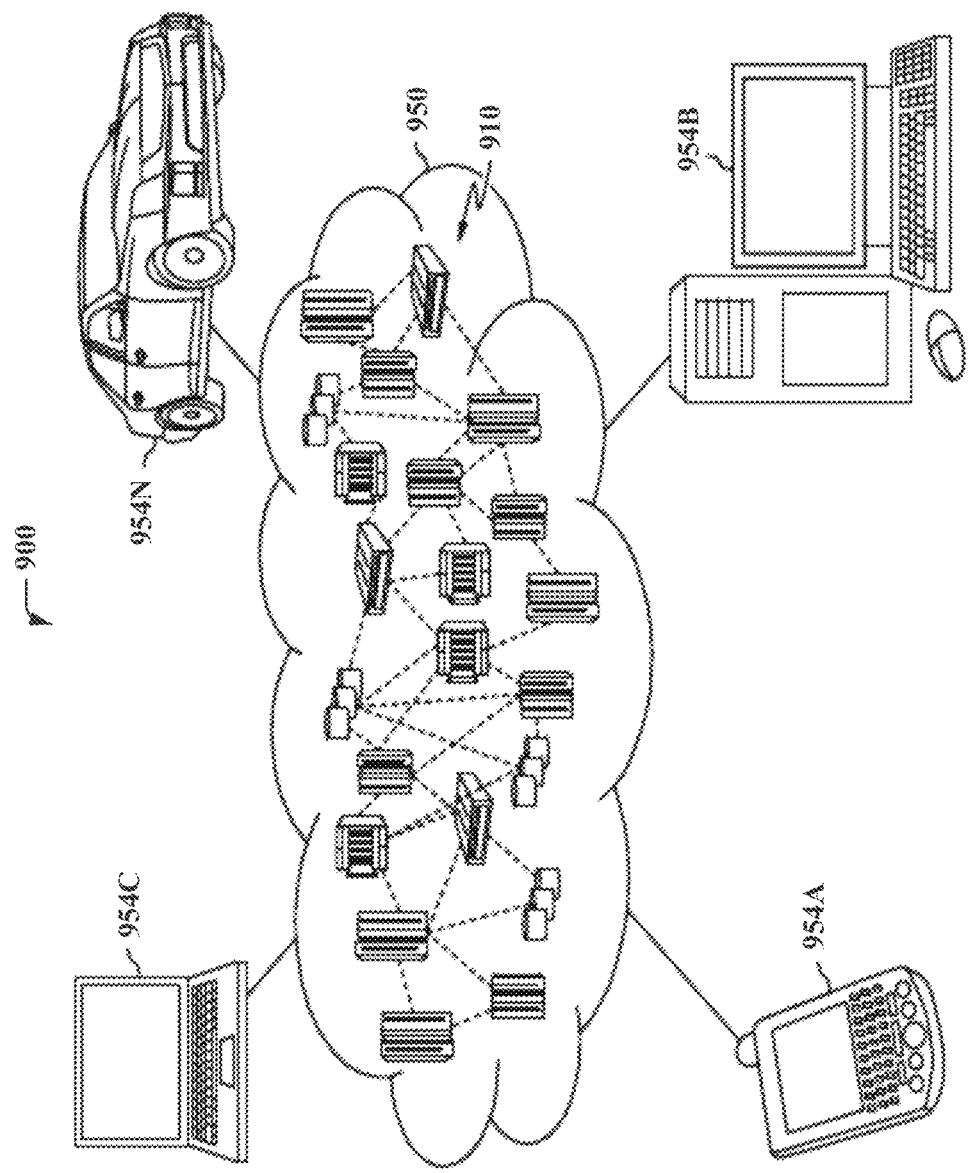
FIG. 9 illustrates a block diagram of an example, non-limiting cloud computing environment in accordance with one or more embodiments described herein.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C and/or automobile computer system 954N can communicate. Although not illustrated in FIG. 9, cloud computing nodes 910 can further comprise a quantum platform (e.g., quantum computer, quantum hardware, quantum software and/or the like) with which local computing devices used by cloud consumers can communicate. Cloud computing nodes 910 can communicate with one another. They can be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that cloud computing nodes 910 and cloud computing environment 950 can communicate with any type of computerized device over any type of network and/or network addressable connection (e.g., using a web browser).

Figure 10:
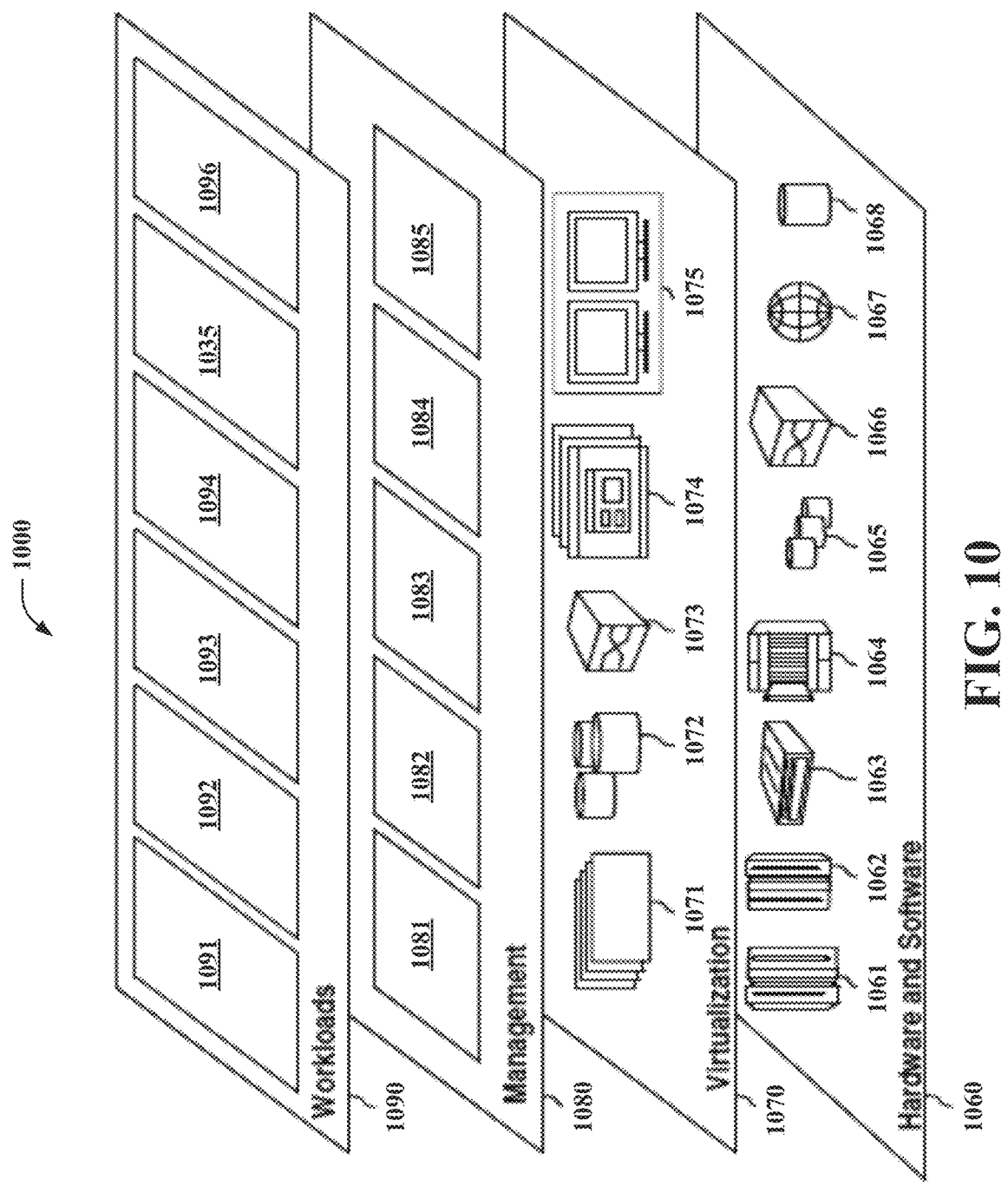
FIG. 10 illustrates a block diagram of a plurality of example, non-limiting abstraction model layers, in accordance with one or more embodiments described herein.

Referring now to FIG. 10, a set of functional abstraction layers is shown, such as provided by cloud computing environment 950 (FIG. 9). It should be understood in advance that the components, layers and/or functions shown in FIG. 10 are intended to be illustrative only, and embodiments described herein are not limited thereto. As depicted, the following layers and corresponding functions are provided:

Hardware and software layer 1060 can include hardware and software components. Examples of hardware components include: mainframes 1061; RISC (Reduced Instruction Set Computer) architecture-based servers 1062; servers 1063; blade servers 1064; storage devices 1065; and networks and networking components 1066. In one or more embodiments, software components can include network application server software 1067, quantum platform routing software 1068 and/or quantum software (not illustrated in FIG. 10).

Virtualization layer 1070 can provide an abstraction layer from which the following examples of virtual entities can be provided: virtual servers 1071; virtual storage 1072; virtual networks 1073, including virtual private networks; virtual applications and/or operating systems 1074; and/or virtual clients 1075.

In one example, management layer 1080 can provide the functions described below. Resource provisioning 1081 can provide dynamic procurement of computing resources and other resources that can be utilized to perform tasks within the cloud computing environment. Metering and Pricing 1082 can provide cost tracking as resources are utilized within the cloud computing environment, and billing or invoicing for consumption of these resources. In one example, these resources can include application software licenses. Security can provide identity verification for cloud consumers and tasks, as well as protection for data and other resources. User (or constituent) portal 1083 can provide access to the cloud computing environment for consumers and system administrators. Service level management 1084 can provide cloud computing resource allocation and management such that required service levels are met. Service Level Agreement (SLA) planning and fulfillment 1085 can provide pre-arrangement for, and procurement of, cloud computing resources for which a future requirement is anticipated in accordance with an SLA.

Workloads layer 1090 can provide examples of functionality for which the cloud computing environment can be utilized. Non-limiting examples of workloads and functions which can be provided from this layer include: mapping and navigation 1091; software development and lifecycle management 1092; virtual classroom education delivery 1093; data analytics processing 1094; transaction processing 1095; and/or application transformation software 1096.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and/or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry or either source code or object code written in any combination of one or more programming languages, including an object oriented programming language such as Smalltalk, C++, or the like, and/or procedural programming languages, such as the "C" programming language or similar programming languages. The computer readable program instructions can execute entirely on the user's computer, partly on the user's computer, as a stand-alone software package, partly on the user's computer and/or partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described herein with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, and/or other device to cause a series of operational acts to be performed on the computer, other programmable apparatus or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality, and operation of possible implementations of systems, computer-implementable methods and/or computer program products according to various embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions and/or acts or carry out combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with other program modules. Generally, program modules include routines, programs, components, data structures and/or the like that perform particular tasks and/or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics, and/or the like. The illustrated aspects can also be practiced in distributed computing environments in which tasks are performed by remote processing devices that are linked through a communications network. However, some, if not all aspects of the one or more embodiments can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and/or gates, in order to optimize space usage or enhance performance of user equipment. A processor can also be implemented as a combination of computing processing units. Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the disclosed memory components of systems and/or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing the one or more embodiments, but one of ordinary skill in the art can recognize that many further combinations and permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a decentralized group of nodes, wherein each node of the decentralized group of nodes comprises:
   at least one memory that stores computer executable components, and a dataset comprising private data that is not accessible to other nodes of the decentralized group of nodes; and
   a processor that executes at least the computer executable components that:
   trains a machine learning model of the node based on the dataset;
   asynchronously trains the machine learning model of the node based on the dataset and one or more other datasets of the other nodes without accessing the private data of the one or more other datasets, and concurrently with respective training of one or more other machine learning models of the other nodes, by iteratively, until a defined criterion is met:
   generating a statistical set based on model parameters of the machine learning model, wherein the dataset is not derivable from the statistical set,
   randomly selecting, based on a selected randomization pattern from a group of randomization patterns, another node from the decentralized group of nodes, wherein the selected randomization pattern is changed at an interval of iterations, wherein the interval of iterations is a random number of iterations,
   sending the statistical set to the other node,
   receiving another statistical set from the other node, wherein the other statistical set is generated from model parameters from the other machine learning model of the other node, and the private data of the other dataset of the other node is not derivable from the other statistical set,
   updating the model parameters of the machine learning model based on the other statistical set,
   retraining the machine learning model based on the dataset, and
   determining whether the machine learning model meets the defined criterion.

2. The system of claim 1, wherein the defined criterion is based on a loss of an objective function associated with the dataset.

3. The system of claim 1, wherein the defined criterion is based on convergence criterion associated with the decentralized group of nodes.

4. The system of claim 1, wherein the machine learning model is trained using a training process that is different from a respective training process employed to train one or more other machine learning models of the other nodes.

5. The system of claim 1, wherein the dataset comprises a type of data that is different from another type of data of one or more other datasets of the other nodes.

6. The system of claim 1, wherein the statistical set comprises one or more model gradients.

7. The system of claim 1, wherein the other statistical set comprises one or more model gradients.

8. A computer-implemented method, comprising:
   training, by a node of a decentralized group of nodes, a machine learning model of the node based on a dataset comprising private data that is not accessible to other nodes of the decentralized group of nodes;
   asynchronously training, by the node, the machine learning model of the node based on the dataset and one or more other datasets of the other nodes without accessing the private data of the one or more other datasets, and concurrently with respective training of one or more other machine learning models of the other nodes, by iteratively, until a defined criterion is met, performing a process respectively employed by the decentralized group of nodes as part of the respective training, where the process comprises:
   generating a statistical set based on model parameters of the machine learning model, wherein the dataset is not derivable from the statistical set,
   randomly selecting, based on a selected randomization pattern from a group of randomization patterns, another node from the decentralized group of nodes, wherein the selected randomization pattern is changed at an interval of iterations, wherein the interval of iterations is a random number of iterations,
sending the statistical set to the other node,
receiving another statistical set from the other node, wherein the other statistical set is generated from model parameters from the other machine learning model of the other node, and the private data of the other dataset of the other node is not derivable from the other statistical set,
updating the model parameters of the machine learning model based on the other statistical set,
retraining the machine learning model based on the dataset, and
determining whether the machine learning model meets the defined criterion.

9. The computer-implemented method of claim 8, wherein the defined criterion is based on a loss of an objective function associated with the dataset.

10. The computer-implemented method of claim 8, wherein the defined criterion is based on convergence criterion associated with the decentralized group of nodes.

11. The computer-implemented method of claim 8, wherein the machine learning model is trained using a training process that is different from a respective training process employed to train one or more other machine learning models of the other nodes.

12. The computer-implemented method of claim 8, wherein the dataset comprises a type of data that is different from another type of data of one or more other datasets of the other nodes.

13. The computer-implemented method of claim 8, wherein the statistical set comprises one or more model gradients.

14. The computer-implemented method of claim 8, wherein the other statistical set comprises one or more model gradients.

15. A computer program product comprising a non-transitory computer readable medium having program instructions embodied therewith, the program instructions executable by a processor of a node of a decentralized group of nodes to cause the processor to:
train a machine learning model of the node based on a dataset comprising private data that is not accessible to other nodes of decentralized;
asynchronously train the machine learning model of the node based on the dataset and one or more other datasets of the other nodes without accessing the private data of the one or more other datasets, and concurrently with respective training of one or more other machine learning models of the other nodes, by iteratively, until a defined criterion is met, performing a process respectively employed by the decentralized group of nodes as part of the respective training, where the process comprises:
a generating a statistical set based on model parameters of the machine learning model, wherein the dataset is not derivable from the statistical set,
randomly selecting, based on a selected randomization pattern from a group of randomization patterns, another node from the decentralized group of nodes, wherein the selected randomization pattern is changed at an interval of iterations, wherein the interval of iterations is a random number of iterations,
sending the statistical set to the other node,
receiving another statistical set from the other node, wherein the other statistical set is generated from model parameters from the other machine learning model of the other node, and the private data of the other dataset of the other node is not derivable from the other statistical set,
updating the model parameters of the machine learning model based on the other statistical set,
retraining the machine learning model based on the dataset, and
determining whether the machine learning model meets the defined criterion.

16. The computer program product of claim 15, wherein the defined criterion is based on a loss of an objective function associated with the dataset.

17. The computer program product of claim 15, wherein the defined criterion is based on convergence criterion associated with the decentralized group of nodes.

18. The computer program product of claim 15, wherein the machine learning model employs is trained using a training process that is different from a respective training process of employed to train one or more other machine learning models of the other nodes.

19. The computer program product of claim 15, wherein the dataset comprises a type of data that is different from another type of data of one or more other datasets of the other nodes.

20. The computer program product of claim 15, wherein the statistical set comprises one or more model gradients.

* * * * *